United States Patent
Kazama et al.

(10) Patent No.: US 8,680,794 B2
(45) Date of Patent: Mar. 25, 2014

(54) LOAD DRIVE SYSTEM, MOTOR DRIVE SYSTEM, AND VEHICLE CONTROL SYSTEM

(75) Inventors: Shun Kazama, Osaka (JP); Makoto Kitabatake, Nara (JP); Masaki Tagome, Osaka (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 13/133,775

(22) PCT Filed: Nov. 18, 2010

(86) PCT No.: PCT/JP2010/006775
§ 371 (c)(1),
(2), (4) Date: Jun. 9, 2011

(87) PCT Pub. No.: WO2011/064970
PCT Pub. Date: Jun. 3, 2011

(65) Prior Publication Data
US 2011/0260656 A1    Oct. 27, 2011

(30) Foreign Application Priority Data
Nov. 26, 2009    (JP) ................................. 2009-268776

(51) Int. Cl.
*H02P 5/68* (2006.01)
(52) U.S. Cl.
USPC ............................................ 318/85; 318/437
(58) Field of Classification Search
USPC ................................................... 318/85, 437
See application file for complete search history.

(56) References Cited

U.S. PATENT DOCUMENTS

| | | | | |
|---|---|---|---|---|
| 4,167,775 A | * | 9/1979 | Baker et al. | 363/42 |
| 4,345,721 A | * | 8/1982 | Derail | 242/477.6 |
| 5,142,468 A | * | 8/1992 | Nerem | 363/71 |
| 5,481,451 A | * | 1/1996 | Kuwahara | 363/37 |
| 6,864,646 B2 | * | 3/2005 | Rahman et al. | 318/41 |
| 7,504,784 B2 | * | 3/2009 | Asada et al. | 318/51 |

(Continued)

FOREIGN PATENT DOCUMENTS

CN    1897455    1/2007
JP    59-204469    11/1984

(Continued)

OTHER PUBLICATIONS

International Search Report issued Jan. 11, 2011 in International (PCT) Application No. PCT/JP2010/006775.

(Continued)

*Primary Examiner* — Bentsu Ro
(74) *Attorney, Agent, or Firm* — Wenderoth, Lind & Ponack, L.L.P.

(57) ABSTRACT

A small-sized load drive system which, even with three three-phase inverters, significantly reduces noise regardless of control duty ratio. The load drive system includes three-phase inverters, and first, second, and third control units. The inverters are connected to loads, respectively. The first control unit generates sawtooth wave voltage and controls the inverter according to the sawtooth wave voltage. The second control unit generates inverse sawtooth wave voltage and controls the inverter according to the inverse sawtooth wave voltage. The third control unit generates triangular wave voltage which has ramps respectively equal to the sawtooth/inverse sawtooth wave voltage and either has a same phase or is out of phase by half a period relative to the sawtooth/inverse sawtooth wave voltage, and also controls the inverter according to the triangular wave voltage.

18 Claims, 19 Drawing Sheets

(56) References Cited

U.S. PATENT DOCUMENTS

| | | | |
|---|---|---|---|
| 8,183,820 B2 * | 5/2012 | Anwar et al. | 320/104 |
| 2005/0052144 A1 | 3/2005 | Matsubara et al. | |
| 2006/0067655 A1 | 3/2006 | Okuda et al. | |
| 2007/0013325 A1 | 1/2007 | Kiuchi et al. | |
| 2008/0089444 A1 | 4/2008 | Shin et al. | |

FOREIGN PATENT DOCUMENTS

| | | |
|---|---|---|
| JP | 63-21427 | 1/1988 |
| JP | 2004-304868 | 10/2004 |
| JP | 2005-86918 | 3/2005 |
| JP | 2006-14483 | 1/2006 |
| JP | 2006-101675 | 4/2006 |
| JP | 2006-333647 | 12/2006 |
| JP | 2008-109727 | 5/2008 |
| JP | 2008-125341 | 5/2008 |
| JP | 2008-193788 | 8/2008 |
| JP | 2008-228399 | 9/2008 |

OTHER PUBLICATIONS

Chinese Office Action (and English translation thereof) issued Jul. 31, 2013 in Chinese Application 201080003875.7.

* cited by examiner

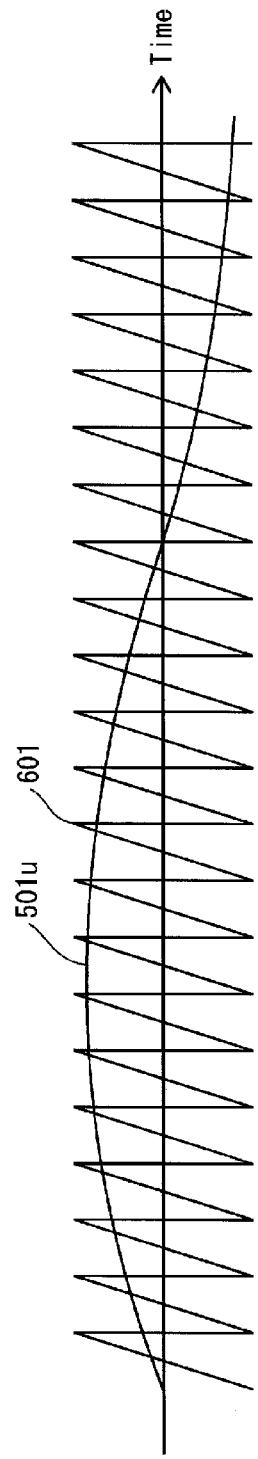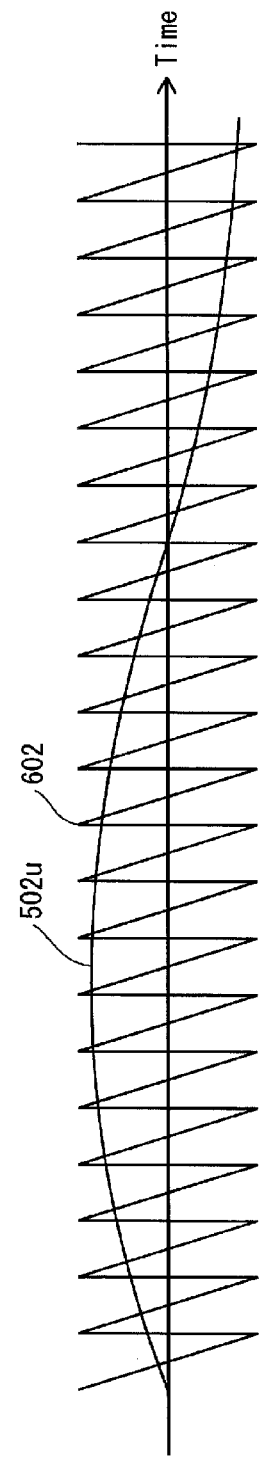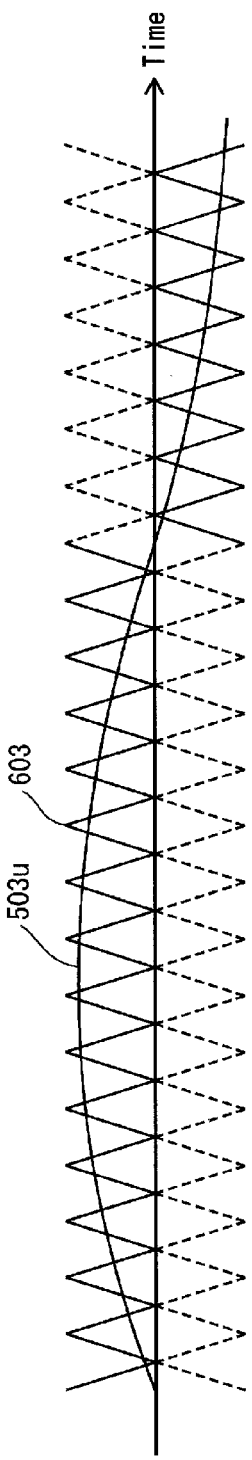

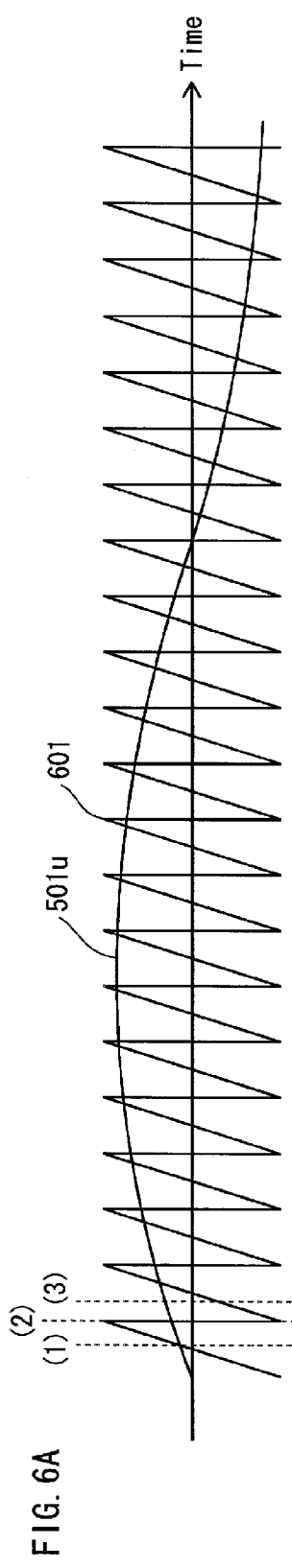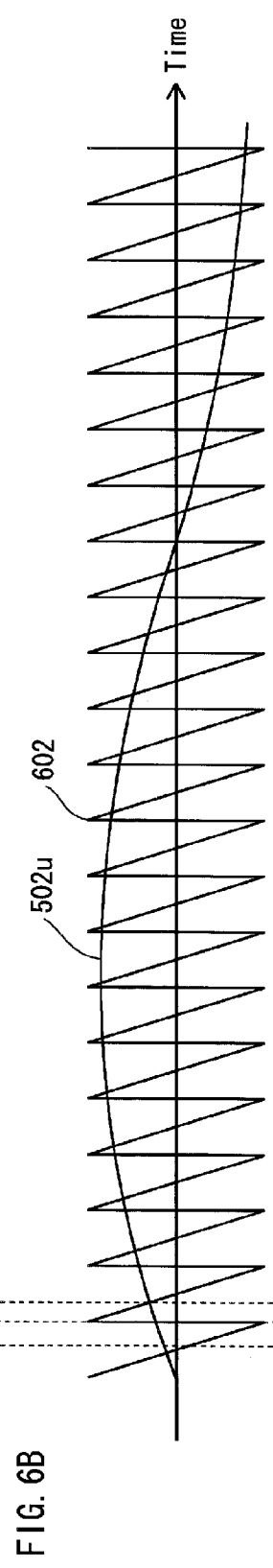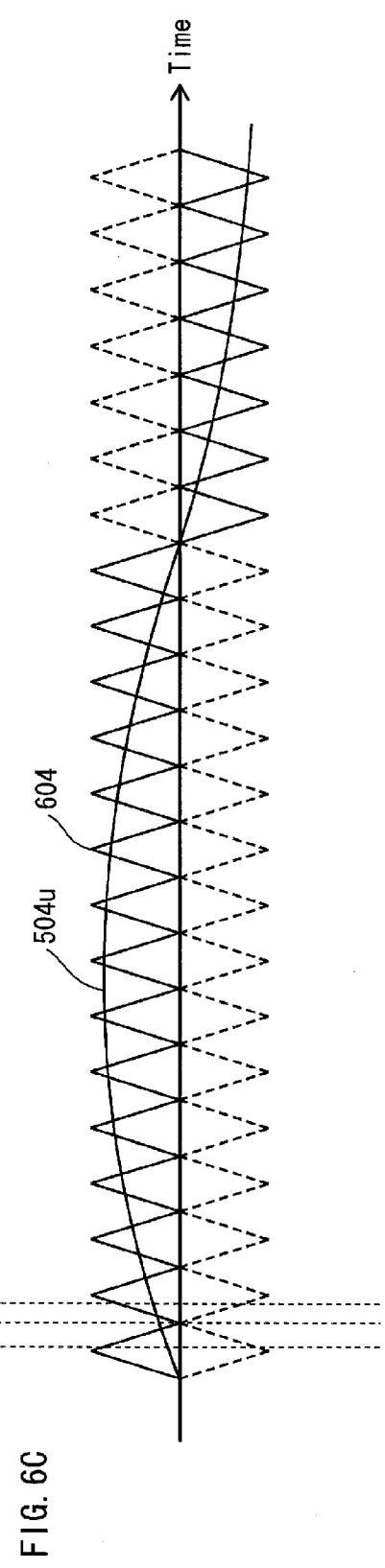
FIG. 6A
FIG. 6B
FIG. 6C

LOAD DRIVE SYSTEM, MOTOR DRIVE SYSTEM, AND VEHICLE CONTROL SYSTEM

BACKGROUND OF INVENTION

1. Technical Field

The present invention relates to noise reduction techniques used in load drive systems, in particular in the load drive systems using PWM control, for driving a load, such as a motor.

2. Background Art

Among the load drive systems, a motor drive system is used in a wide range of fields. The motor drive system includes a three-phase alternative current motor (may be referred to below simply as a motor), a three-phase inverter that converts a direct current to an alternative current to supply the converted current to the motor, and a control unit that controls the three-phase inverter. For example, as a main motor for use in an electrical vehicle and a hybrid vehicle, an interior permanent magnet motor, in other words a brushless DC motor is employed.

As a method for obtaining a sine wave output voltage from the three-phase inverter, PWM (Pulse Width Modulation) control is generally used. In the PWM control, switching operations are performed at a high speed by switching devices connected in series in each of U-phase, V-phase, and W-phase arms. This contributes heavily to generation of high-frequency switching noise. Furthermore, the motor has parasitic capacitance to ground between the motor itself and a frame ground. Accordingly, when flowing via the parasitic capacitance to ground, the switching noise might cause damage to a bearing of the motor and malfunction of the accessories.

As a way to solve the above problems, Patent Literature 1 discloses a noise reduction method used in a system for driving one motor having two three-phase coil groups by two three-phase inverters, for example. In a structure of Patent Literature 1, a first carrier signal is used in a first three-phase inverter. The first carrier signal is a sawtooth wave (e.g. a waveform formed by repeated cycles of voltage increasing gradually from a first level to reach a second level, and then dropping instantly to the first level). On the other hand, a second carrier signal is used in a second three-phase inverter. The second carrier signal is an inverse sawtooth wave which is inverted with respect to the sawtooth wave. By thus using a pair of the first carrier signal of the sawtooth wave and the second carrier signal of the inverse sawtooth wave, noise is reduced for the following two reasons. A description here focuses on a pair of switching devices constituting identical arms of a same phase in the first and the second three-phase inverters. Note that the "pair of switching devices constituting the identical arms of the same phase" herein refers to, for example, a switching device constituting an upper arm of U-phase in the first three-phase inverter and a switching device constituting an upper arm of U-phase in the second three-phase inverter.

(1) It is assumed that the switching device of the first three-phase inverter transitions from an ON state to an OFF state at a time point when the voltage instantly drops in the sawtooth wave, that is to say, at the time point when the voltage instantly increases in the inverse sawtooth wave. In this case, simultaneously with the transition of the switching device in the first three-phase inverter, the switching device of the second three-phase inverter reversely transitions from the OFF state to the ON state. In this way, the switching devices of the two three-phase inverters simultaneously transition in the opposite state transition directions. Accordingly, switching noise generated by these switching device operations has opposite directions, whereby noise is cancelled out by each other.

(2) At any time point other than the above time point, using the sawtooth wave and the inverse sawtooth wave prevents the pair of switching devices included in the two three-phase inverters from simultaneously transitioning in the same state transition direction. Accordingly, even when the switching noise is generated due to the operation of each switching device, overlapping between the noise is prevented.

The above phenomena similarly occur in every pair of switching devices corresponding with each other between the first and the second three-phase inverters. As a result, noise is reduced.

CITATION LIST

Patent Literature

[Patent Literature 1] Japanese patent application publication No. 2008-228399
[Patent Literature 2] Japanese patent application publication No. 2008-109727

SUMMARY OF INVENTION

According to the structure disclosed in Patent Literature 1, noise reduction effect is achieved in a case of using two pairs of a three-phase inverter and a three-phase alternative current motor. However, in a case of using three pairs of the three-phase inverter and the three-phase alternative current motor (e.g. in a load drive system in which three three-phase inverters output voltages of a total of nine phases to three three-phase alternative current motors), the following problems arise. For example, it is presumed that the first carrier signal is the sawtooth wave voltage, the second carrier signal is the inverse sawtooth wave voltage, and the third carrier signal is the sawtooth wave voltage. As described in the item (1) on the above, at the time point when the voltage instantly drops and instantly increases in the sawtooth/inverse sawtooth waves, a magnitude relation between a control signal and the corresponding carrier signal is reversed with respect to each sawtooth wave. At the time point, the switching is made in the opposite state transition directions in the first and the second three-phase inverters, whereby the noise is cancelled out by each other, as mentioned above. However, the noise generated in the third three-phase inverter remains without being cancelled out. Furthermore, at the time point when the voltage instantly drops and instantly increases, the magnitude relation between the control signal and the corresponding carrier signal is reversed simultaneously with respect to all of the U-phase, V-phase, and W-phase. Accordingly, in the third three-phase inverter, the switching is made in the same state transition direction simultaneously in all of U-phase, V-phase, and W-phase. This means that the third three-phase inverter generates the noise formed by the overlap of three types of switching noise.

The present invention is conceived in view of the above problems, and it is an objective of the present invention to provide a noise reduction method which significantly reduces noise in load drive systems for driving the three-phase alternative current motors by, for example, three three-phase inverters.

In order to achieve the above objective, one aspect of the present invention provides a load drive system for driving first, second, and third loads, comprising: first, second, and third three-phase inverters each having an input terminal and an output terminal, the input terminals of the first, the second, and the third three-phase inverters being connected to a direct current power source, the output terminals of the first, the second, and the third three-phase inverters being respectively connected to the first, the second, and the third loads; a first control unit operable to (i) generate a first carrier signal of a sawtooth waveform and (ii) control the first three-phase inverter according to the generated first carrier signal; a second control unit operable to (i) generate a second carrier signal of a sawtooth waveform which is inverted with respect to the first carrier signal and has a same frequency and a same phase as the first carrier signal and (ii) control the second three-phase inverter according to the generated second carrier signal; and a third control unit operable to (i) generate a third carrier signal of a triangular waveform having ramps respectively equal to the sawtooth waveform of the first carrier signal and the sawtooth waveform of the second carrier signal, the triangular waveform either having a same phase as the first and the second carrier signals or being out of phase by half a period relative to the first and the second carrier signals, and (ii) control the third three-phase inverter according to the generated third carrier signal.

SUMMARY OF INVENTION

According to the present invention, switching in opposite state transition directions is made in the first and the second three-phase inverters, whereby noise is cancelled out by each other. Furthermore, regarding the triangular waveform used as the third carrier signal, there is no time point when the voltage instantly drops or instantly increases as can be seen in the sawtooth waveform. Accordingly, in the triangular waveform, a magnitude relation between a control signal and the carrier signal cannot be reversed simultaneously with respect to all of U-phase, V-phase, and W-phase. This prevents the situation where the switching in a same state transition direction is made simultaneously in all of U-phase, V-phase, and W-phase in the third three-phase inverter. As a result, overlap of three types of switching noise is prevented. Accordingly, compared with a case where the sawtooth wave voltage is used as the third carrier signal, the noise is reduced.

Furthermore, the third carrier signal is of the triangular waveform having the same ramp as the sawtooth waveform of the first carrier signal and the inverse sawtooth waveform of the second carrier signal, and either having the same phase as the first and the second carrier signals or being out of phase by half the period relative to the first and the second carrier signals. With the above structure, the switching is made at a same timing between the first and the third three-phase inverters or between the second and the third three-phase inverters. Here, when the switching in the third three-phase inverter is made in the state transition direction opposite to the first three-phase inverter or the second three-phase inverter, the switching is made in the opposite state transition direction between the first and the second three-phase inverters or between the second and the third three-phase inverters. This means that the switching noise generated by the switching is cancelled out by each other. As a result, the noise is further reduced.

BRIEF DESCRIPTION OF DRAWINGS

FIGS. 2A, 2B, and 2C are waveform diagrams showing U-phase control signals and first, second, and third carrier signals according to the first embodiment.

FIGS. 6A, 6B, and 6C are waveform diagrams showing the U-phase control signals and the first, the second, and the third carrier signals according to the second embodiment.

DETAILED DESCRIPTION OF INVENTION

The following describes preferred embodiments of the present invention with reference to the drawings.

[First Embodiment]

<Structure>

(Load Drive System 100)

Figure 1:
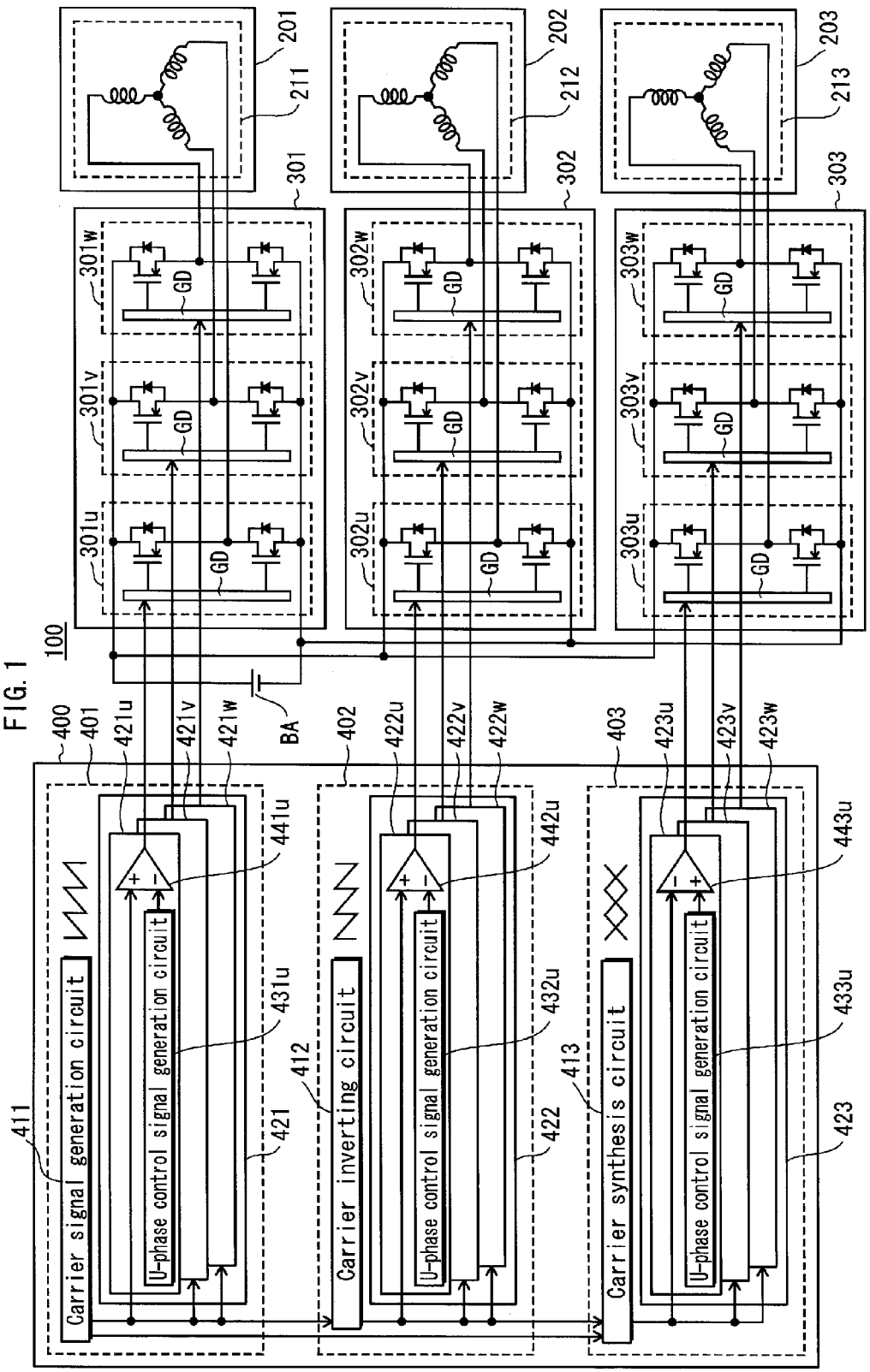
FIG. 1 shows an overall structure of a load drive system according to a first embodiment.

FIG. 1 shows an overall structure of a load drive system according to a first embodiment of the present invention.

A load drive system 100 includes a direct current battery BA, three-phase alternative current motors 201, 202, and 203, three-phase inverters 301, 302, and 303, and a control circuit 400.

The direct current battery BA is a direct current power source obtained by rectifying commercial power source, or a direct current power of a battery type (such as a nickel hydride second battery and a lithium-ion secondary battery).

The three-phase alternative current motor 201 includes a three-phase coil 211 to which a three-phase current is supplied. The three-phase alternative current motor 202 includes a three-phase coil 212 to which a three-phase current is supplied. Regarding the three-phase alternative current motor 203, a difference from the three-phase alternative current motor 201 lies in a point that a three-phase coil 213 is wound in a direction opposite to the three-phase coil 211 (which is described in the details in an item after the next item). Apart from this point, the three-phase alternative current motor 203 is the same as the three-phase alternative current motor 201.

The three-phase inverter 301 has an input terminal and an output terminal. The input terminal is connected to the direct current battery BA, and the output terminal is connected to the three-phase alternative current motor 201. The three-phase inverter 301 includes a U-phase arm 301$u$, a V-phase arm 301$v$, and W-phase arm 301$w$. Each arm includes switching devices connected in series, diodes connected in parallel to the switching devices, and a gate drive circuit GD for driving the switching devices. As the switching devices, power semiconductor devices, such as IGBTs and MOSFETs, are used. In a case where the MOSFETs are used as the switching devices, intrinsic body diodes may be used as the diodes.

The three-phase inverters 302 and 303 have the same structure as the three-phase inverter 301. Note that, however, output terminals of the three-phase inverters 302 and 303 are connected to the three-phase alternative current motors 202 and 203, respectively, although input terminals of the three-phase inverters 302 and 303 are both connected to the direct current battery BA.

The control circuit 400 controls operations of the three-phase inverters 301, 302, and 303. A description is given below of the details of the control circuit 400.

(Control Circuit 400)

The control circuit 400 includes a first control unit 401 which controls the operations of the three-phase inverter 301, a second control unit 402 which controls the operations of the three-phase inverter 302, and a third control unit 403 which controls the operations of the three-phase inverter 303.

The first control unit 401 includes a first carrier signal generation circuit 411 and a first PWM signal generation circuit family 421. The first carrier signal generation circuit 411 generates a first carrier signal of a sawtooth waveform as shown by a reference numeral 601 in FIG. 2A. The first PWM signal generation circuit family 421 generates PWM signals of U-phase, V-phase, and W-phase, with use of the first carrier signal.

The second control unit 402 includes a carrier inverting circuit 412 and a second PWM signal generation circuit family 422. The carrier inverting circuit 412 is, for example, an inverting amplifier circuit with a control gain of 1, and outputs an output signal in which input voltage is inverted about a reference voltage. This generates a second carrier signal 602 of a sawtooth waveform which is inverted with respect to the first carrier signal and has a same frequency and a same phase as the first carrier signal, as shown in FIG. 2B. Since the control gain is set to be 1, amplitude of the first carrier signal equals amplitude of the second carrier signal. The second PWM signal generation circuit family 422 generates PWM signals of U-phase, V-phase, and W-phase, with use of the second carrier signal.

The third control unit 403 includes a carrier synthesis circuit 413 and a third PWM signal generation circuit family 423. The carrier synthesis circuit 413 is, for example, a circuit that selectively outputs one of the first and the second carrier signals at every half period of the first carrier signal. This generates a third carrier signal 603 of a triangular waveform having a ramp of the sawtooth wave of the first carrier signal and the ramp of the sawtooth wave of the second carrier signal. The third PWM signal generation circuit family 433 generates PWM signals of U-phase, V-phase, and W-phase, with use of the third carrier signal.

As shown in FIG. 2C, the waveform of the third carrier signal 603 looks like a combination of two triangular waves. In fact, however, the carrier synthesis circuit 413 does not output two signals at the same time. When a control signal is positive, the carrier synthesis circuit 413 selects the second carrier signal in the first half period and the first carrier signal in the latter half period. When a control signal is negative, the carrier synthesis circuit 413 selects the first carrier signal in the first half period and the second carrier signal in the latter half period. The above structure makes it possible to output only a positive signal when the control signal is positive, and only a negative signal when the control signal is negative. In FIG. 2C, a solid line indicates a portion that is actually output by the carrier synthesis circuit 413, while a dotted line indicates a portion that is not actually output by the carrier synthesis circuit 413. Meanwhile, the carrier synthesis circuit 413 includes a circuit for synthesizing the third carrier signal of U-phase, a circuit for synthesizing the third carrier signal of V-phase, and a circuit for synthesizing the third carrier signal of W-phase. Each of these three circuits is input with information indicating whether the control signal of the corresponding phase is positive or negative, from a control signal generation circuit or another control circuit. Based on the information indicating positive or negative, each of the three circuits synthesizes the third carrier signal of the corresponding phase.

The next item contains a description of the first PWM signal generation circuit family 421, the second PWM signal generation circuit family 422, and the third PWM signal generation circuit family 423 in the details.

(PWM Signal Generation Circuit Families 421, 422, and 423)

The first PWM signal generation circuit family 421 includes a first U-phase

PWM signal generation circuit 421$u$, a first V-phase PWM signal generation circuit 421$v$, and a first W-phase PWM signal generation circuit 421$w$.

The first U-phase PWM signal generation circuit 421$u$ includes a U-phase control signal generation circuit 431$u$ and a comparator 441$u$. The U-phase control signal generation circuit 431$u$ generates a U-phase control signal. The U-phase control signal generated by the U-phase control signal generation circuit 431$u$ is input to an inverting input terminal of the comparator 441$u$. On the other hand, the first carrier signal is input to a non-inverting input terminal of the comparator 441$u$. The comparator 441$u$ outputs a drive signal of a pulse waveform as a comparison result, and the drive signal is supplied to the U-phase arm 301$u$ of the three-phase inverter 301 via the gate drive circuit GD as a first U-phase PWM signal.

The first V-phase PWM signal generation circuit 421$v$ performs the operations similar to the first U-phase PWM signal generation circuit 421$u$ with respect to V-phase. The first W-phase PWM signal generation circuit 421$w$ also performs the operations similar to the first U-phase PWM signal generation circuit 421$u$ with respect to W-phase.

A second U-phase PWM signal generation circuit 422$u$ includes a U-phase control signal generation circuit 432$u$ and a comparator 442$u$. Like the U-phase control signal generation circuit 431$u$, the U-phase control signal generation circuit 432$u$ outputs the U-phase control signal to the comparator 442$u$. The U-phase control signal generated by the U-phase control signal generation circuit 432$u$ is input to the inverting input terminal of the comparator 442$u$. On the other hand, the second carrier signal is input to the non-inverting input terminal of the comparator 442$u$. The comparator 442$u$ outputs a drive signal of the pulse waveform as a comparison result, and the drive signal is supplied to the U-phase arm 302u of the three-phase inverter 302 via the gate drive circuit GD as a second U-phase PWM signal.

A second V-phase PWM signal generation circuit 422v performs the operations similar to the second U-phase PWM signal generation circuit 422u with respect to V-phase. A second W-phase PWM signal generation circuit 422w also performs the operations similar to the second U-phase PWM signal generation circuit 422u with respect to W-phase.

A third U-phase PWM signal generation circuit 423u includes a U-phase control signal generation circuit 433u and a comparator 443u. Like the U-phase control signal generation circuit 431u, the U-phase control signal generation circuit 433u outputs the U-phase control signal to the comparator 443u. The third carrier signal is input to the inverting input terminal of the comparator 443u. On the other hand, the U-phase control signal generated by the U-phase control signal generation circuit 433u is input to the non-inverting input terminal of the comparator 443u. The comparator 443u outputs a drive signal with the pulse waveform as a comparison result, and the drive signal is supplied to the U-phase arm 303u of the three-phase inverter 303 via the gate drive circuit GD as a third U-phase PWM signal.

A third V-phase PWM signal generation circuit 423v performs the operations similar to the third U-phase PWM signal generation circuit 423u with respect to V-phase. A third W-phase PWM signal generation circuit 423w also performs the operations similar to the third U-phase PWM signal generation circuit 423u with respect to W-phase.

It is ensured that the U-phase control signal generation circuits 431u, 432u, and 433u output the U-phase control signals having the same phase and the same amplitude. In other words, the U-phase control signals 501u, 502u, and 503u have the same phase and the same amplitude. This ensures that the switching devices included in the corresponding arms of the three-phase inverters simultaneously transition to the ON state and to the OFF state. In order to provide the U-phase control signals 501u, 502u, and 503u with the same phase, it is only necessary to operate the U-phase control signal generation circuits 431u, 432u, and 433u in synchronization. Specifically, this can be achieved by outputting a synchronization signal to the U-phase control signal generation circuits 431u, 432u, and 433u, for example. Similarly, in order to provide the U-phase control signals 501u, 502u, and 503u with the same amplitude, it is only necessary to set the same control gain in the U-phase control signal generation circuits 431u, 432u, and 433u. Specifically, this can be achieved by providing an automatic gain control circuit prior to the stage of the U-phase control signal generation circuits 431u, 432u, and 433u, for example.

This also applies to the V-phase control signal and the W-phase control signal.

In the present embodiment, each of the comparators 441 and 442 switches ON the switching device included in an upper part of the corresponding arm (i.e. upper-arm switching device) when the control signal is greater than the carrier signal.

Conversely, the comparator 443 switches OFF the switching device included in the upper part of the corresponding arm (i.e. upper-arm switching device) when the control signal is greater than the carrier signal. It should be noted that, providing that the three-phase alternative current motors 201, 202, and 203 all have the same structure, a rotation direction of the three-phase alternative current motor 203 is supposed to be opposite to the three-phase alternative current motors 201 and 202. However, owing to the fact that the three-phase coil 213 is wound in the direction opposite to the three-phase coils 211 and 212, the rotation directions of the three-phase alternative current motors 201, 202, and 203 are made to be the same.

Figure 16:
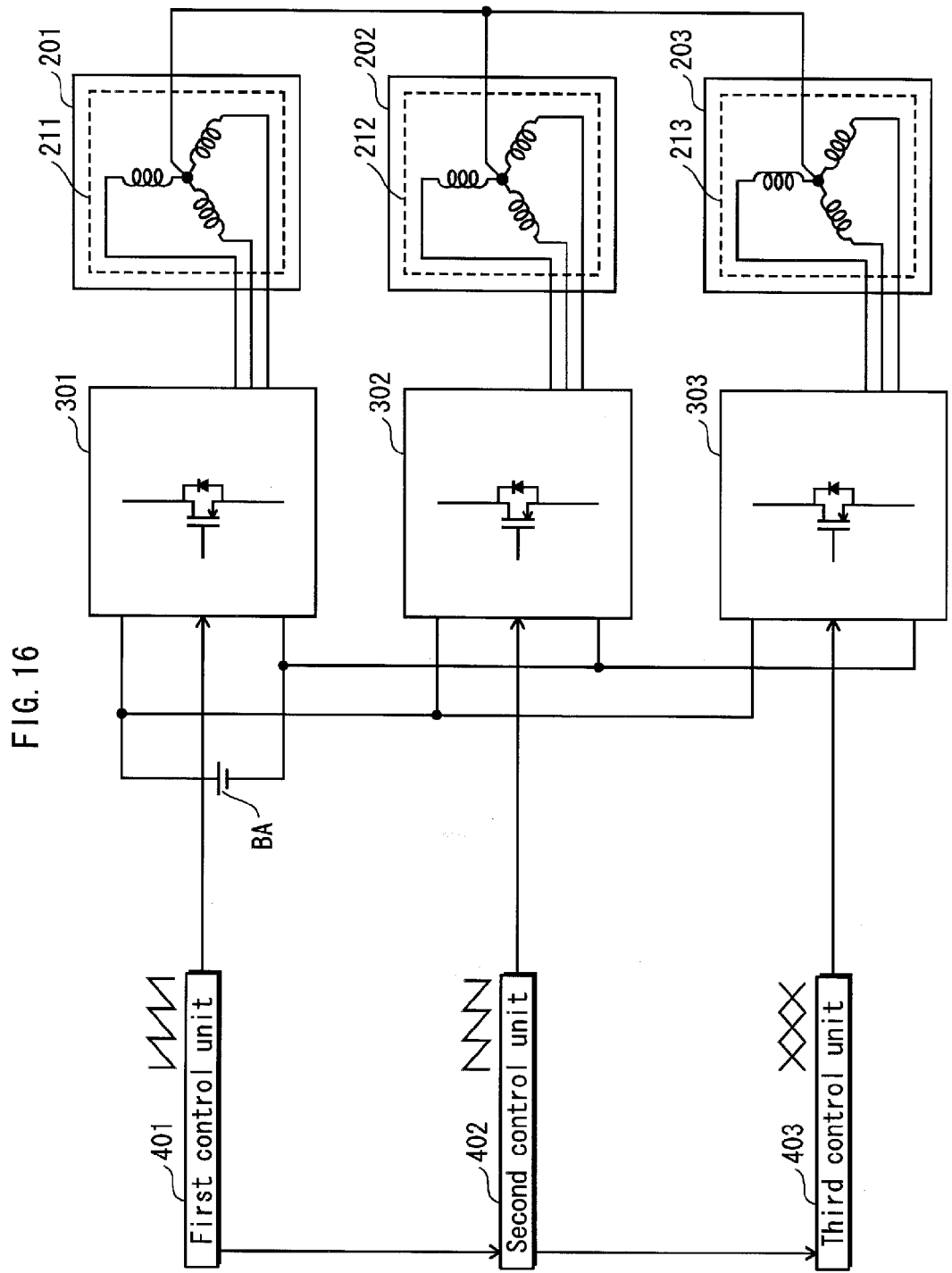
FIG. 16 shows an overall structure of the load drive system according to a modification (4).

It is ensured that the three-phase alternative current motors 201, 202, and 203 each have the same amount of parasitic capacitance to ground. This is because, with the same amount of parasitic capacitance to ground, the three-phase alternative current motors each let the same amount of a noise current flow via the parasitic capacitance to ground, and the noise cancellation effect is increased. This can be achieved by equalizing a distance between a neutral point of the three-phase alternative current motor 201 and earth, a distance between the neutral point of the three-phase alternative current motor 202 and the earth, and a distance between the neutral point of the three-phase alternative current motor 203 and the earth. Furthermore, as shown in FIG. 16, the neutral points of the three-phase alternative current motors are preferably connected with each other so as to ensure that all the neutral points are at a same potential. With the above structure, each neutral point is surely made to be at the same potential, whereby the noise cancellation effect is further increased.

Furthermore, it is ensured that, in any of the switching devices constituting the respective arms of each three-phase inverter, a time required for the transition from the ON state to the OFF state equals a time required for the transition from the OFF state to the ON state. This ensures that the switching devices included in the corresponding arms simultaneously transition to the ON state and to the OFF state.

Moreover, generally speaking, to prevent a short from being caused by switching ON of both upper-arm and lower-arm switching devices of the same phase included in the three-phase inverter, a dead time is provided for each PWM signal which is to be input to the corresponding arm via the gate drive circuit GD. Here, it is ensured that the dead times provided for the PWM signals are set to be the equal to each other in all arms of the same phase in the three-phase inverters. The reason is that it is necessary to prevent a decrease in the noise reduction effect that would be caused by differences in the dead time periods. In a case where there are characteristic (e.g. temperature) variations between the switching devices, the dead times are set to be adjustable. By doing so, the noise reduction effect is still increased.

<Principle of Noise Reduction>

FIGS. 2A, 2B, and 2C are waveform diagrams showing the carrier signals and the U-phase control signals according to the first embodiment. FIG. 2A shows the first carrier signal 601 and the U-phase control signal 501u that are input to the comparator 441u. FIG. 2B shows the second carrier signal 602 and the U-phase control signal 502u that are input to the comparator 442u. FIG. 2C shows the third carrier signal 603 and the U-phase control signal 503u that are input to the comparator 443u.

Figure 3:
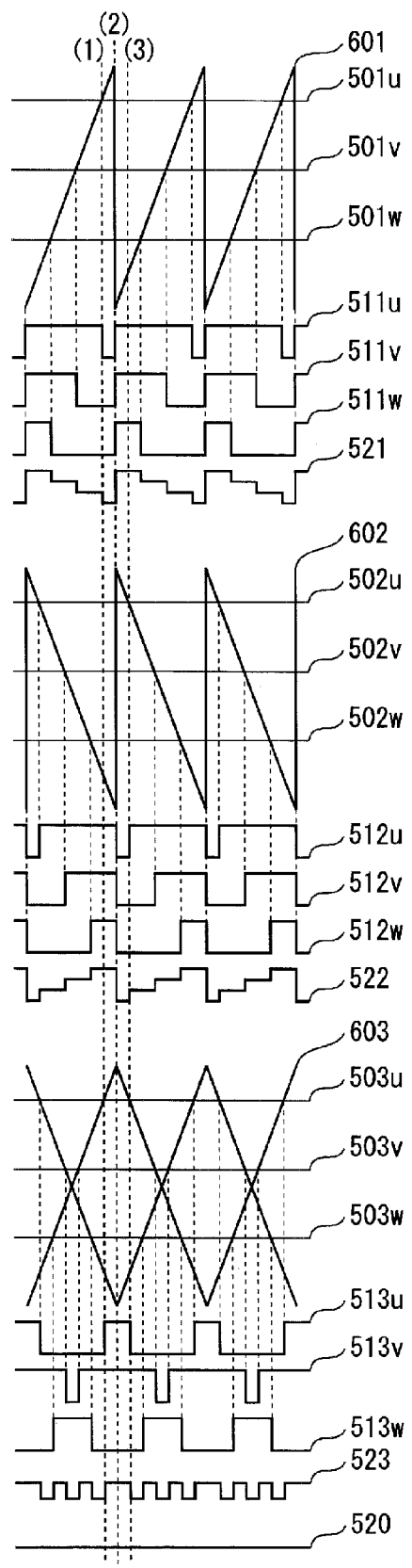
FIG. 3 is an enlarged view showing the waveforms of the U-phase, V-phase, and W-phase control signals, and the first, the second, and the third carrier signals according to the first embodiment.

FIG. 3 is an enlarged view of FIGS. 2A, 2B, and 2C, in which V-phase control signals 501v, 502v, and 503v and W-phase control signals 501w, 502w, and 503w are additionally depicted. With reference to FIG. 3, a description is given specifically of a principle of the noise reduction. For the sake of understandability, the description only takes the upper-arm switching device of U-phase as an example. Note that the same principle also applies to V-phase and W-phase.

At a time point (1) shown in FIG. 3, in the first U-phase PWM signal generation circuit 421u, a magnitude relation between the U-phase control signal 501u and the first carrier signal 601 is reversed. Accordingly, the upper-arm switching device of the U-phase arm 301u included in the first three-phase inverter transitions from the ON state to the OFF state. In the second U-phase PWM signal generation circuit 422u, no switching device makes a state transition. In the third U-phase PWM signal generation circuit 423u, the magnitude relation between the U-phase control signal 503u and the third carrier signal 603 is reversed. Accordingly, the upper-arm switching device of the U-phase arm 303u included in the third three-phase inverter transitions from the OFF state to the ON state. Accordingly, at the time point (1), the transition from the ON state to the OFF state and the reverse transition from the OFF state to the ON state are simultaneously made in the first and the third three-phase inverters.

Then, at a time point (2), in the first U-phase PWM signal generation circuit 421u, the magnitude relation between the U-phase control signal 501u and the first carrier signal 601 is reversed. Accordingly, the upper-arm switching device of the U-phase arm 301u included in the first three-phase inverter transitions from the OFF state to the ON state. In the second U-phase PWM signal generation circuit 422u, the magnitude relation between the U-phase control signal 502u and the second carrier signal 602 is reversed. Accordingly, the upper-arm switching device of the U-phase arm 302u included in the second three-phase inverter transitions from the ON state to the OFF state. In the third U-phase PWM signal generation circuit 423u, no switching device makes a state transition. Accordingly, at the time point (2), the transition from the OFF state to the ON state and the reverse transition from the ON state to the OFF state are simultaneously made in the first and the second three-phase inverters.

Subsequently, at a time point (3), no switching device makes a state transition in the first U-phase PWM signal generation circuit 421u. In the second U-phase PWM signal generation circuit 422u, the magnitude relation between the U-phase control signal 502u and the second carrier signal 602 is reversed. Accordingly, the upper-arm switching device of the U-phase arm 302u included in the second three-phase inverter transitions from the OFF state to the ON state. In the third U-phase PWM signal generation circuit 423u, the magnitude relation between the U-phase control signal 503u and the third carrier signal 603 is reversed. Accordingly, the upper-arm switching device of the U-phase arm 303u included in the third three-phase inverter transitions from the ON state to the OFF state.

Accordingly, at the time point (3), the transition from the OFF state to the ON state and the reverse transition from the ON state to the OFF state are simultaneously made in the second and the third three-phase inverters.

Note that the transition from the ON state to the OFF state and the transition from the OFF state to the ON state do not need to be made simumutaneously at the above time points (1) to (3), and may be made at any timing.

Here, the switching causes common mode noise to flow in the U-phase arm 301u, the V-phase arm 301v, and the W-phase arm 301w in the three-phase inverter 301. The common mode noise waveforms are indicated by reference numerals 511u, 511v, and 511w in FIG. 3. Similarly, waveforms of the common mode noise caused to flow in the respective arms in the three-phase inverter 302 are indicated by reference numerals 512u, 512v, and 512w. Furthermore, waveforms of the common mode noise caused to flow in the respective arms in the three-phase inverter 303 are indicated by reference numerals 513u, 513v, and 513w.

The waveform of common mode noise caused to flow in the three-phase inverter 301 as a whole is represented by summing up all the waveforms 511u, 511v, and 511w, which is indicated by a reference numeral 521. The waveform of the common mode noise caused to flow in the three-phase inverter 302 as a whole is also obtained by summing up all the waveforms 512u, 512v, and 512w, which is indicated by a reference numeral 522. The waveform of common mode noise caused to flow in the three-phase inverter 303 as a whole is also represented by summing up all the waveforms 513u, 513v, and 513w, which is indicated by a reference numeral 523.

The waveform of common mode noise caused to flow in the load drive system 100 as a whole is reperesented by summing up all the waveforms 521, 522, and 523, which is indicated by a reference numeral 520. For example, at the time point (1), the upper-arm switching device of the U-phase arm 301u included in the first three-phase inverter is turned OFF, while the upper-arm switching device of the U-phase arm 303u included in the third three-phase inverter is reversely turned OFF.

By doing so, the common mode noise is cancelled out by each other. In the present embodiment, the corresponding two switching devices (i.e. two upper-arm switching devices or two lower-arm switching devices) in two three-phase inverters do not necessarily need to simultaneously transition in the opposite state transition directions at the time point (1), and may simultaneously transition in the opposite state transition directions at any timing. As a result, the common mode noise is cancelled by each other at any timing. Accordingly, the common mode noise caused to flow in the load drive system 100 as a whole is completely cancelled out.

<Result of Noise Simulation>

Figure 4A:
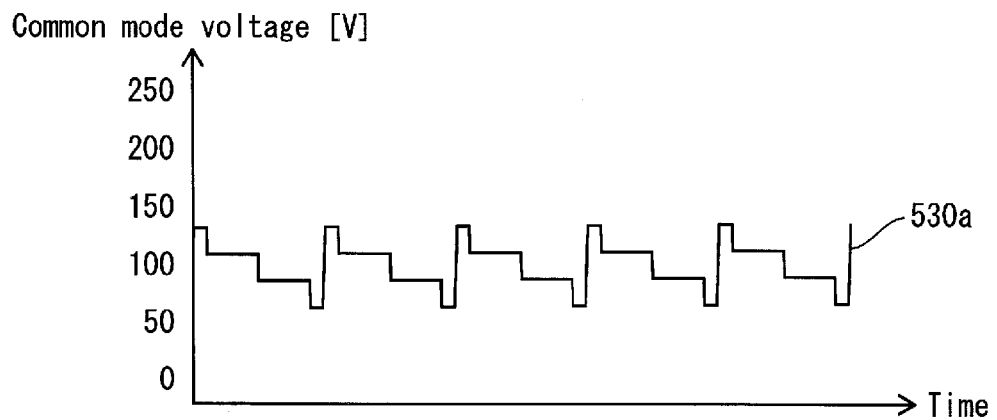
FIGS. 4A, 4B, and 4C show results of common mode noise simulations according to the first embodiment and comparative examples.
Figure 4B:
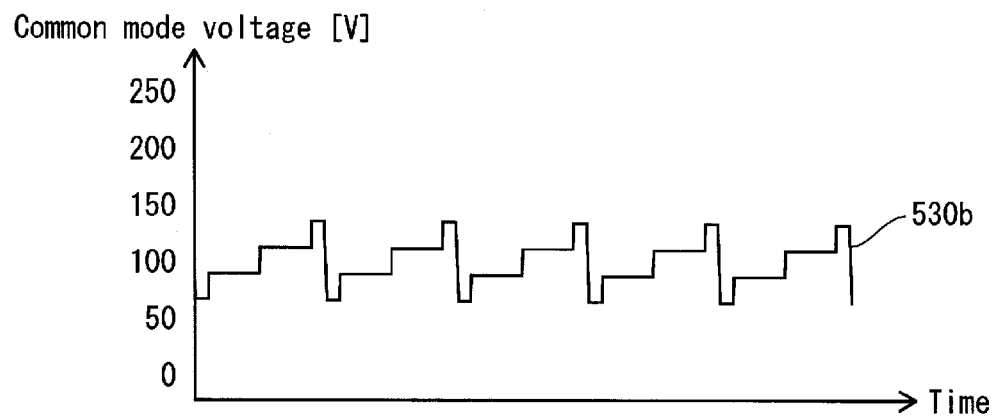
Figure 4C:
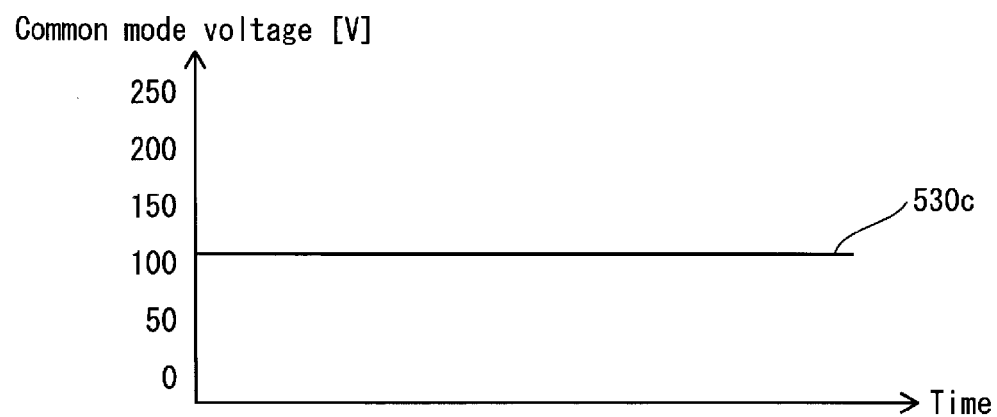

FIGS. 4A, 4B, and 4C show results of noise simulations that have been performed to demonstrate the noise reduction effect in the present embodiment. FIG. 4A is a comparative example, and shows a result of the common mode noise simulation in which the first carrier signal 601 of the present embodiment is used as each of the first carrier signal, the second carrier signal, and the third carrier signal.

A waveform 530b of FIG. 4B is another comparative example, and represents a result of the common mode noise simulation in which the first carrier signal 601 of the present embodiment is used as the first carrier signal and the third carrier signal, and the second carrier signal 602 of the present embodiment is used as the second carrier signal. A waveform 530c of FIG. 4C represents a result of the common mode noise simulation in the present embodiment. As can be clearly seen from the results of the noise simulations, the structure of the present embodiment completely cancels out the noise.

As has been described, the present embodiment prevents the situation where the switching is made in the same state transition direction simultaneously in all the U-phase, the V-phase, and the W-phase arms in the third three-phase inverter. Furthermore, the present embodiment allows the two switching devices to simultaneously transition from the ON state to the OFF state, and reversely from the OFF state to the ON state at any timing. As a result, the noise is cancelled out, thereby providing the improved noise reduction effect. Besides, owing to the fact that the two switching devices are caused to transition to the ON state and the OFF state simultaneously, surge currents generated between the direct current power source and the three-phase inverters are also cancelled out by each other. Accordingly, the present invention is useful to reduce not only the above-described common mode noise but also normal mode noise.

Moreover, the noise reduction method according to the present invention does not use various noise reduction components, such as an EMI filter and a shield. Accordingly, the use of various noise reduction components is limited in the system as a whole, and the load drive system with a low cost and of a small size is provided.

[Second Embodiment]
<Structure>
(Load Drive System 110)

Figure 5:
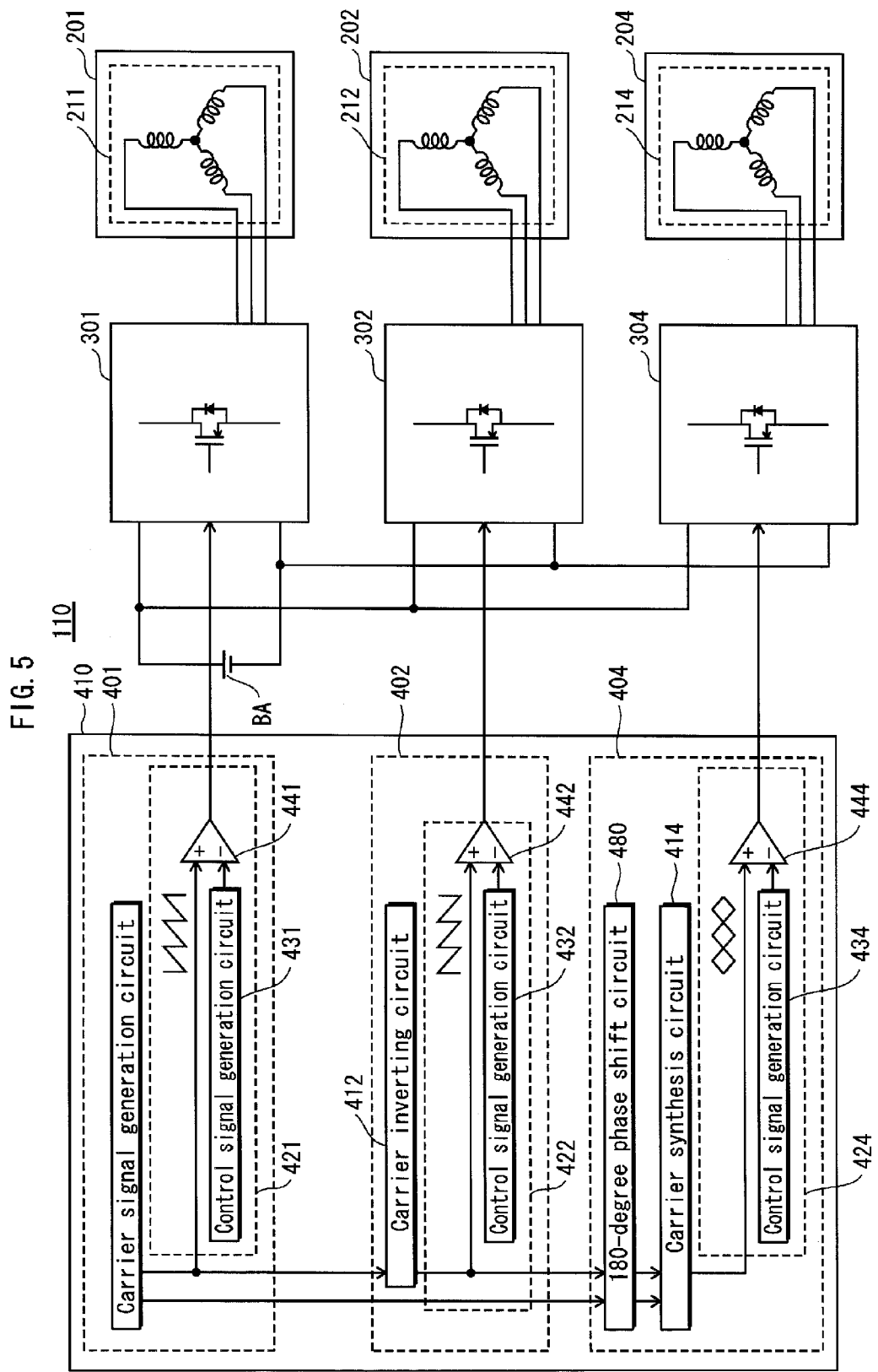
FIG. 5 shows an overall structure of the load drive system according to a second embodiment.

FIG. 5 shows an overall structure of the load drive system according to a second embodiment of the present invention. A load drive system 110 shown in FIG. 5 includes a three-phase alternative current motor 204, a three-phase inverter 304, and a control circuit 410, as replacement for the three-phase alternative current motor 203, the three-phase inverter 303, and the control circuit 400 included in the load drive system 100 shown in FIG. 1. The following describes the structure of the load drive system 110 that differs from the load drive system 100 according to the first embodiment.

The three-phase alternative current motor 204 includes a three-phase coil 214 to which a three-phase current is supplied. A difference from the three-phase alternative current motor 203 lies in a point that the three-phase coil 214 is wound in the direction opposite to the three-phase coil 213 according to the first embodiment. That is to say, in the present embodiment, the the three-phase coils 211, 212, and 214 are wound in the same direction.

The three-phase inverter 304 has the same structure as the three-phase inverter 303 of the first embodiment. Note that, however, the input terminal of the three-phase inverter 304 is connected to the direct current battery BA, and the output terminal of the three-phase inverter 304 is connected to the three-phase alternative current motor 204.

The control circuit 410 controls operations of the three-phase inverters 301, 302, and 304. A description is given below of the details of the control circuit 410.

(Control Circuit 410)

The control circuit 410 includes a third control unit 404 as replacement for the third control unit 403 included in the control circuit 400 shown in FIG. 1.

The third control unit 404 includes a 180-degree phase shift circuit 480, a carrier synthesis circuit 414, and a third PWM signal generation circuit family 424.

To the input terminal of the 180-degree phase shift circuit 480, the first carrier signal and the second carrier signal are input. The 180-degree phase shift circuit 480 advances or delays the input first carrier signal and the second carrier signal by half a period of the first carrier signal and the second carrier signal, respectively. In other words, the 180-degree phase shift circuit 480 outputs a new first carrier signal and a new second carrier signal which have a phase shift of 180 degrees with respect to the input first carrier signal and the input second carrier signal, respectively.

The carrier synthesis circuit 414 performs the operations similar to the carrier synthesis circuit 413 of the first embodiment. Note that, however, the third carrier signal of the present embodiment has the phase shift of 180 degrees with respect to the third carrier signal of the first embodiment, and has the triangular waveform as shown by a reference numeral 604 in FIG. 6C. The third PWM signal generation circuit family 424 generates PWM signals of U-phase, V-phase, and W-phase, with use of the third carrier signal.

The next item contains a description of the third PWM signal generation circuit family 424 in the details.

(PWM Signal Generation Circuit Family 424)

The third PWM signal generation circuit family 424 includes a control signal generation circuit 434 and a comparator 444. FIG. 5 is a block diagram collectively showing respective components of U-phase, V-phase, and W-phase, namely, the PWM signal generation circuit families 421, 422, and 424, the control signal generation circuits 431, 432, 434, and the comparators 441, 442, and 444. The control signal generation circuit 434 generates a control signal. The generated control signal is input to the inverting input terminal of the comparator 444. On the other hand, the third carrier signal generated by the carrier synthesis circuit 414 is input to the non-inverting input terminal of the comparator 444. The comparator 444 outputs a drive signal of the pulse waveform as a comparison result, and the drive signal is supplied to the respective arms of the three-phase inverter 304 as a third PWM signal.

In the present embodiment, all the comparators 441, 442, and 444 switch ON the upper-arm switching devices of the three-phase invertes when the control signal is greater than the carrier signal.

<Principle of Noise Reduction>

FIGS. 6A, 6B, and 6C are waveform diagrams showing the carrier signals and the control signals according to the second embodiment. FIG. 6A shows the first carrier signal 601 and the U-phase control signal 501u that are input to the comparator 441. FIG. 6B shows the second carrier signal 602 and the U-phase control signal 502u that are input to the comparator 442. FIG. 6C shows the third carrier signal 604 and the U-phase control signal 504u that are input to the comparator 444. With reference to FIGS. 6A, 6B, and 6C, a description is given specifically of the principle of the noise reduction. Although the description herein only takes the upper-arm switching devices of U-phase as an example, the same principle also applies to V-phase and W-phase.

At a time point (1) shown in FIGS. 6A, 6B, and 6C, in the first PWM signal generation circuit family 421, the magnitude relation between the U-phase control signal 501u and the first carrier signal 601 is reversed. Accordingly, the upper-arm switching device of the U-phase arm included in the three-phase inverter 301 transitions from the ON state to the OFF state. In the second PWM signal generation circuit family 422 and the third PWM signal generation circuit family 424, no switching device makes a state transition. Accordingly, at the time point (1), the switching in the same state transition direction is not made simultaneously in the three three-phase inverters.

Then, at a time point (2), in the first PWM signal generation circuit family 421, the magnitude relation between the U-phase control signal 501u and the first carrier signal 601 is reversed. Accordingly, the upper-arm switching device of the U-phase arm included in the three-phase inverter 301 transitions from the OFF state to the ON state. In the second PWM signal generation circuit family 422, the magnitude relation between the U-phase control signal 502u and the carrier signal 602 is reversed. Accordingly, the upper-arm switching device of the U-phase arm included in the three-phase inverter 302 transitions from the ON state to the OFF state. In the third PWM signal generation circuit family 424, no switching device makes a state transition. Accordingly, at the time point (2), the transition from the ON state to the OFF state and the transition from the OFF state to the ON state are simultaneously made in the two three-phase inverters.

Subsequently, at a time point (3), no switching device makes a state transition in the first PWM signal generation circuit family 421. In the second PWM signal generation circuit family 422, the magnitude relation between the U-phase control signal 502u and the second carrier signal 602 is reversed. Accordingly, the upper-arm switching device of the U-phase arm included in the three-phase inverter 302 transitions from the OFF state to the ON state. In the third PWM signal generation circuit family 424, no switching device makes a state transition. Accordingly, at the time point (3), the switching in the same state transition direction is not made simultaneously in the three three-phase inverters.

The present embodiment is not limited to the above time points (1) to (3), and similar effects may be achieved at any timing.

<Result of Noise Simulation>

Figure 7A:
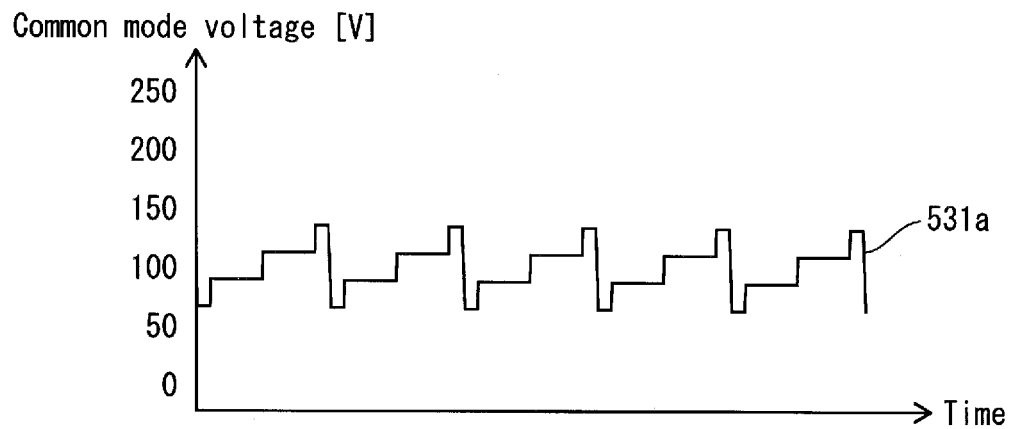
FIGS. 7A and 7B show results of the common mode noise simulations according to the second embodiment and comparative examples.
Figure 7B:
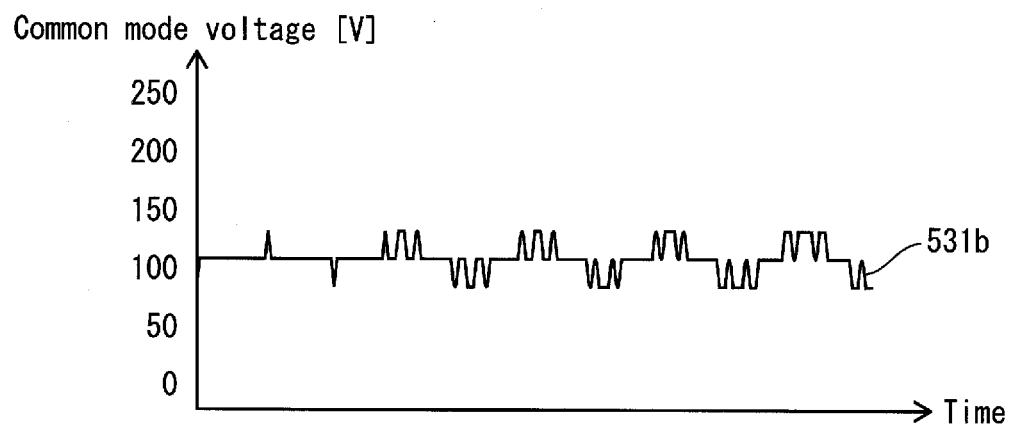

FIGS. 7A and 4B show results of noise simulations that have been performed to demonstrate the noise reduction effect in the present embodiment. FIG. 7A is a comparative example, and shows a result of the common mode noise simulation in which the first carrier signal 601 of the present embodiment is used as each of the first carrier signal and the third carrier signal, and the second carrier signal 602 of the present embodiment is used as the second carrier signal. A waveform 531b of FIG. 7B represents a result of the common mode noise simulation in the present embodiment. As can be clearly seen from the results of the noise simulations, the structure of the present embodiment also reduces the noise.

As has been described, the present embodiment prevents the situation where the switching is made in the same state transition direction simultaneously in all the U-phase, the V-phase, and the W-phase arms in the third three-phase inverter. Furthermore, the present embodiment allows the two switching devices to simultaneously transition from the ON state to the OFF state and from the OFF state to the ON state at the time point (2), for example. Accordingly, although the noise is not completely cancelled out as in the first embodiment, the present embodiment provides an improved noise reduction effect compared with conventional techniques. Moreover, unlike the first embodiment in which the structure of the third three-phase alternative current motor 203 must be differentiated from the three-phase alternative current motors 201 and 202, in the present embodiment, the identical three-phase alternative current motors may be used as the three-phase alternative current motors 201, 202, and 204.

[Third Embodiment]

<Structure>

(Load Drive System 120)

Figure 8:
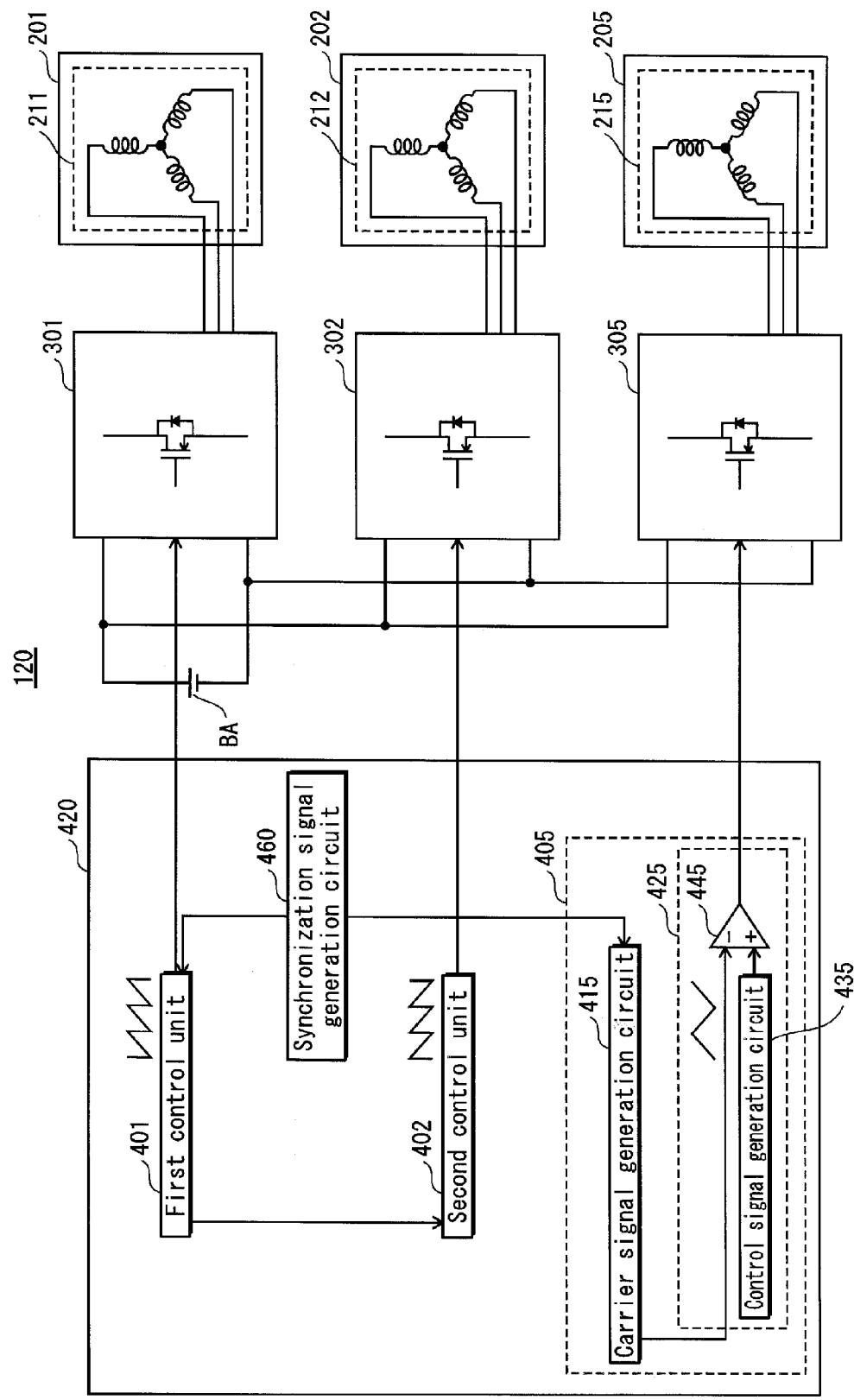
FIG. 8 shows an overall structure of the load drive system according to a third embodiment.

FIG. 8 shows an overall structure of the load drive system according to a third embodiment of the present invention. A load drive system 120 shown in FIG. 8 includes a three-phase alternative current motor 205, a three-phase inverter 305, and a control circuit 420, as replacement for the three-phase alternative current motor 203, the three-phase inverter 303, and the control circuit 400 included in the load drive system 100 shown in FIG. 1. The following describes the structure of the load drive system 120 that differs from the load drive system 100 according to the first embodiment.

The three-phase alternative current motor 205 includes a three-phase coil 215 to which a three-phase current is supplied. The three-phase coil 215 has the same structure as the three-phase coil 213 of the first embodiment. In other words, the three-phase coil is wound in the direction opposite to the three-phase coils 211 and 212.

The three-phase inverter 305 has the same structure as the three-phase inverter 303 of the first embodiment. Note that, however, the input terminal of the three-phase inverter 305 is connected to the direct current battery BA, and the output terminal of the three-phase inverter 305 is connected to the three-phase alternative current motor 205.

The control circuit 420 controls operations of the three-phase inverters 301, 302, and 305. A description is given below of the details of the control circuit 420.

(Control Circuit 420)

The control circuit 420 includes a third control unit 405 as replacement for the third control unit 403 included in the control circuit 400 shown in FIG. 1, and additionally includes a synchronization signal generation circuit 460.

The first control unit 405 includes a third carrier signal generation circuit 415 and a third PWM signal generation circuit family 425.

The third carrier signal generation circuit 415 is a circuit that generates the triangular wave having ramps respectively equal to the sawtooth wave of the first carrier signal and the sawtooth wave of the second carrier signal. The triangular wave generation circuit generates the triangular wave by charging and discharging a capacitor while comparing two threshold voltages with each other. In the generation, the triangular wave of a desired frequency can be obtained by, for example, varying a capacitance of the capacitor. In the present embodiment, the capacitance etc. of the capacitor in the third carrier signal generation circuit 415 is set so as to generate the third carrier signal 605 of the triangular wave having half the frequency of the first and the second carrier signals as shown in FIG. 9C. The third PWM signal generation circuit family 425 generates PWM signals of U-phase, V-phase, and W-phase, with use of the third carrier signal.

Here, a time required for the voltage in the third carrier signal 605 to gradually increase from a first level (which corresponds to a valley portion in the third carrier signal 605) to a second level (which corresponds to a peak portion in the third carrier signal 605) equals a time required for the voltage in the first carrier signal 601 to gradually increase from the first level (which corresponds to the valley portion in the first carrier signal 601) to the second level (which corresponds to the peak portion in the first carrier signal 601). Also, a time required for the voltage in the third carrier signal 605 to gradually increase from the second level to the first level equals a time required for the voltage in the second carrier signal 602 to gradually increase from the second level to the first level. In other words, the third carrier signal 605 has the same phase with respect to the first carrier signal 601 and the second carrier signal 602.

The synchronization signal generation circuit 460 outputs, to the first carrier signal generation circuit included in the first control unit 401 and the third carrier signal generation circuit 415, a synchronization signal for providing the first carrier signal and the third carrier signal with the same phase.

The next item contains a description of the third PWM signal generation circuit family 425 in the details.

(PWM Signal Generation Circuit Family 425)

The third PWM signal generation circuit family 425 includes a control signal generation circuit 435 and a comparator 445. The control signal generation circuit 435 outputs a control signal to the comparator 445. The third carrier signal generated by the third carrier signal generation circuit 415 is input to the inverting input terminal of the comparator 445. On the other hand, the control signal generated by the control signal generation circuit 435 is input to the non-inverting input terminal of the comparator 445. The comparator 445 outputs a drive signal of the pulse waveform as a comparison result, and the drive signal is supplied to the respective arms of the three-phase inverter 305 as the third PWM signal.

In the present embodiment, the first control unit 401 and the second control unit 402 switch ON the upper-arm switching devices when the control signal is greater than the carrier signal. Conversely, the comparator 445 included in the third control unit 405 switches OFF the upper-arm switching devices when the control signal is greater than the carrier signal. It should be noted that, providing that the three-phase alternative current motors 201, 202, and 205 all have the same structure, the rotation direction of the three-phase alternative current motor 205 is supposed to be opposite to the three-phase alternative current motors 201 and 202. However, as is similar to the first embodiment, owing to the fact that the three-phase coil 215 is wound in the direction opposite to the three-phase coils 211 and 212, the rotation directions of the three-phase alternative current motors 201, 202, and 205 are made to be the same.

<Principle of Noise Reduction>

Figure 9A:
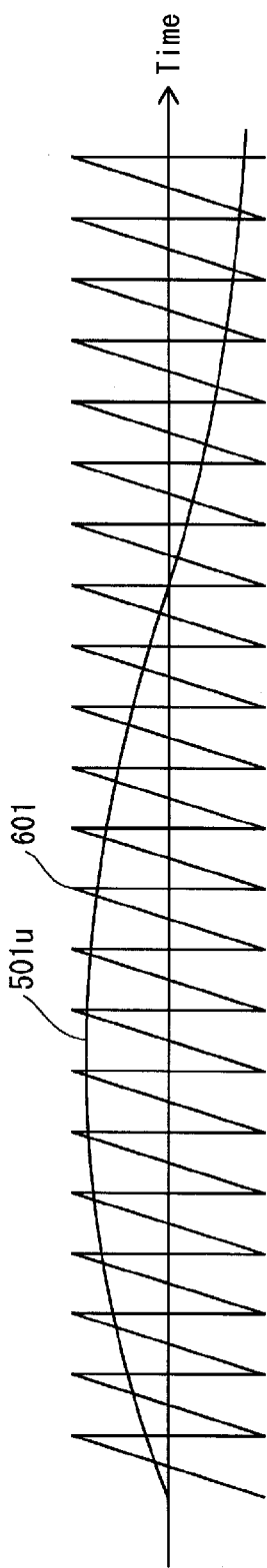
FIGS. 9A, 9B, and 9C are waveform diagrams showing the U-phase control signals and the first, the second, and the third carrier signals according to the third embodiment.
Figure 9B:
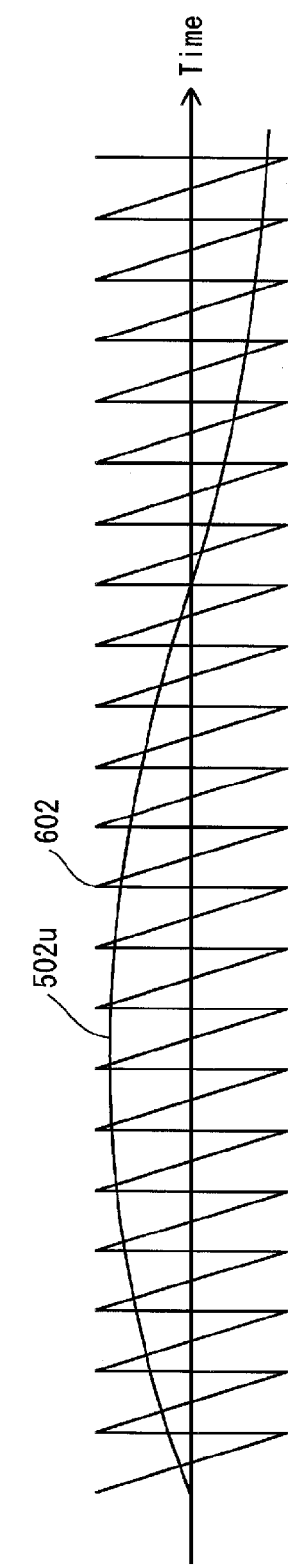
Figure 9C:
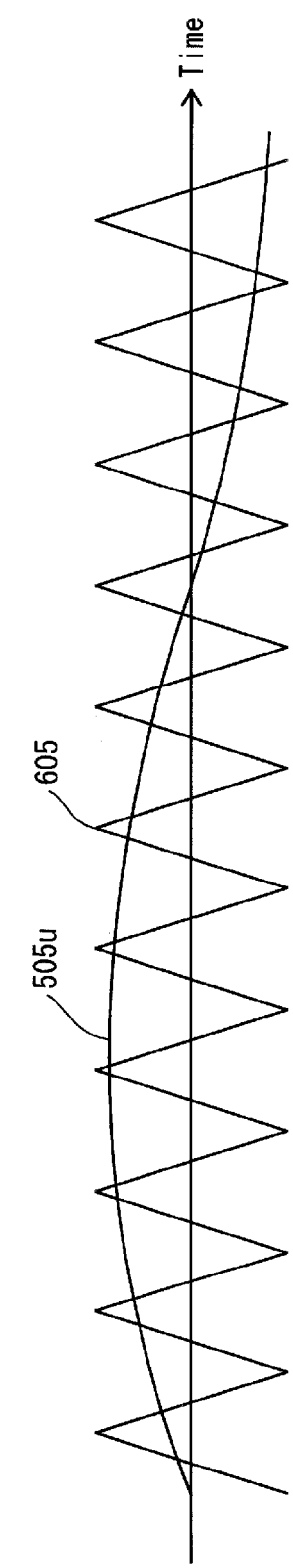

FIGS. 9A, 9B, and 9C are waveform diagrams showing the carrier signals and the U-phase control signals according to the third embodiment. FIG. 9A shows the first carrier signal 601 and the U-phase control signal 501u that are input to the comparator included in the first control unit 401. FIG. 9B shows the second carrier signal 602 and the U-phase control signal 502u that are input to the comparator included in the second control unit 402. FIG. 9C shows the third carrier signal 605 and the U-phase control signal 505u that are input to the comparator 445. In comparison with the third carrier signal 603 of the first embodiment, the third carrier signal 605 of the present embodiment has the same phase and half the frequency. Accordingly, in the present embodiment, the timing of cancelling the noise is retarded such that only a half of the noise is cancelled out compared with the first embodiment. That is to say, the noise reduction effect is approximately halved compared with the first embodiment. Meanwhile, in the first and the second embodiments, a control duty ratio of the third three-phase inverter is different from control duty ratios of the first and the second three-phase inverters. In contrast, the present embodiment is able to provide the same control duty ratio to all the three three-phase inverters.

<Result of Noise Simulation>

Figure 10A:
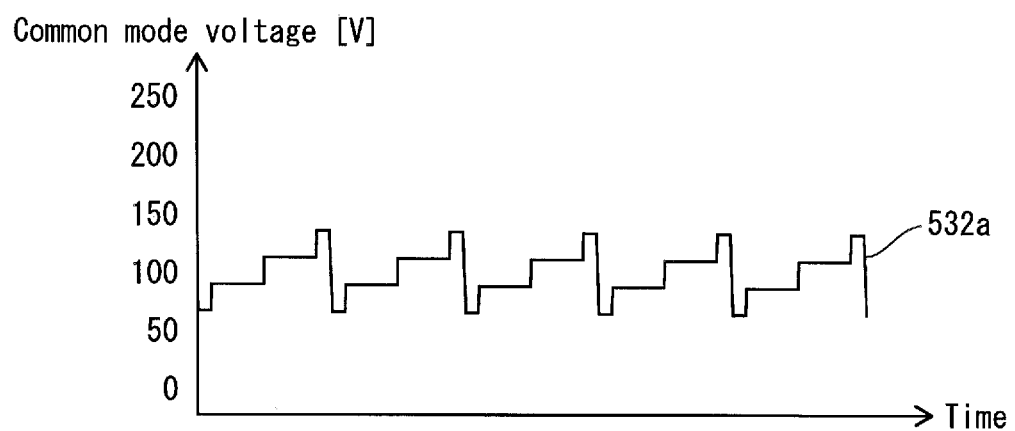
FIGS. 10A and 10B show results of the common mode noise simulations according to the third embodiment and comparative examples.
Figure 10B:
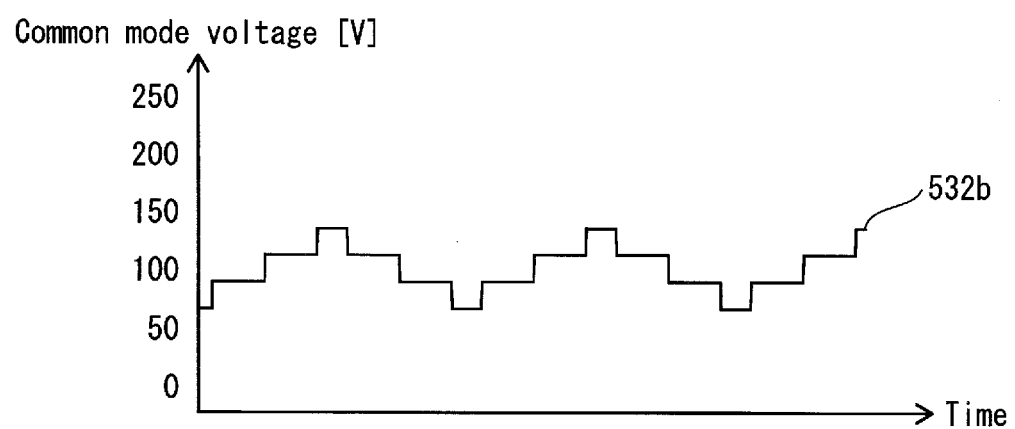

FIGS. 10A and 10B show results of noise simulations that have been performed to demonstrate the noise reduction effect in the present embodiment. A waveform 532a of FIG. 10A represents a comparative example, and shows a result of the common mode noise simulation in which the first carrier signal 601 of the present embodiment is used as each of the first carrier signal and the third carrier signal, and the second carrier signal 602 of the present embodiment is used as the second carrier signal. A waveform 532b of FIG. 10B represents a result of the common mode noise simulation in the present embodiment. Here, the noise current I, the parasitic capacitance C, and potential change dv/dt due to the switching have a relation represented by the relation formula I=C× dv/dt. That is to say, the noise current I is proportional to the potential change dv/dt. In the figures, a comparison is now made with respect to processes in which the common mode potentials change from the highest points to the lowest points. It can be seen that the common mode potential changes in one step in FIG. 10A, whereas the common mode potential changes in three steps in FIG. 10B. This means that dv/dt in FIG. 10B is one third of dv/dt shown in FIG. 10A. From the above relation formula, in the present embodiment, the noise current is reduced to one third of that in the comparative example during the process in which the common mode potential changes from the highest point to the lowest point. Accordingly, the structure of the present embodiment also reduces the noise.

As has been described, the present embodiment prevents the situation where the switching is made in the same state transition direction simultaneously in all the U-phase, the V-phase, and the W-phase arms in the third three-phase inverter. Furthermore, the present embodiment also allows two switching devices to simultaneously transition to the ON state and to the OFF state. Accordingly, although not as effective as the first embodiment, the present embodiment reduces not only the above-described common mode noise but also the normal mode noise.

[Other Modifications]

The load drive system of the present invention is described above based on the embodiments. However, the present invention is not limited to the embodiments. For example, the following modifications are possible.

(1) In all the embodiments, the description is given of the load drive system including three three-phase inverters. However, the present modification proposes the noise reduction method in the load drive system including four three-phase inverters.

<Structure>

(Load Drive System 130)

Figure 11:
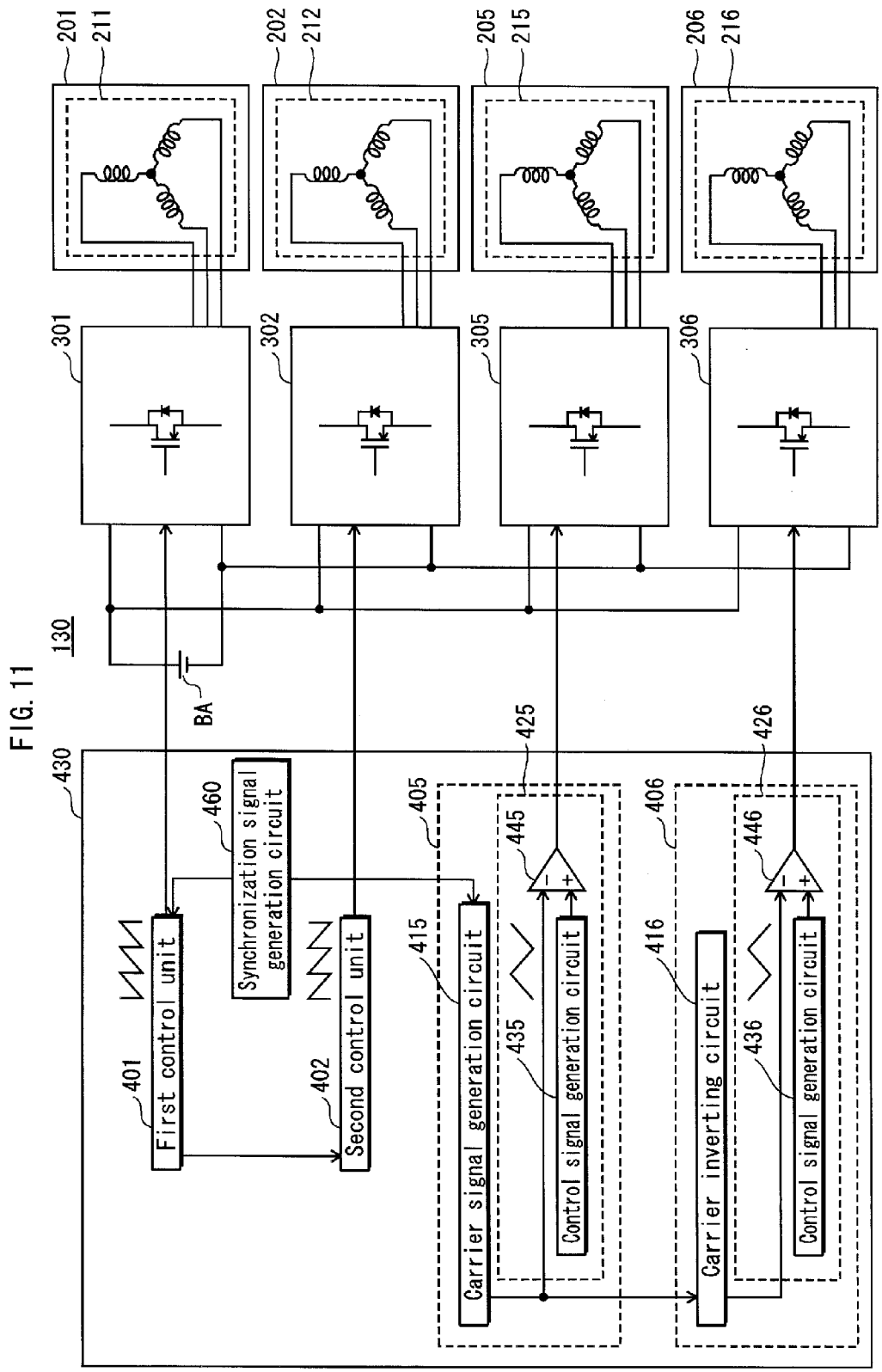
FIG. 11 shows an overall structure of the load drive system according to a modification (1).

FIG. 11 shows an overall structure of the load drive system according to the modification (1).

In comparison with the load drive system 120 shown in FIG. 8, a load drive system 130 showing in FIG. 11 additionally includes a three-phase alternative current motor 206 and a three-phase inverter 306, and includes a control circuit 430 as replacement for the control circuit 420. The following describes the structure of the load drive system 130 that differs from the load drive system 120 according to the third embodiment.

The three-phase alternative current motor 206 includes a three-phase coil 216 to which a three-phase current is supplied. The three-phase coil 216 is wound in the same direction as the three-phase coil 214 according to the third embodiment. In other words, in the present embodiment, the three-phase coils 215 and 216 are wound in the direction opposite to the three-phase coils 211 and 212.

The three-phase inverter 306 has the same structure as the three-phase inverter 305 of the third embodiment. Note that, however, the input terminal of the three-phase inverter 306 is connected to the direct current battery BA, and the output terminal of the three-phase inverter 306 is connected to the three-phase alternative current motor 206.

The control circuit 430 controls operations of the three-phase inverters 301, 302, 305, and 306. A description is given below of the details of the control circuit 430.

(Control Circuit 430)

In comparison with the control circuit 420 shown in FIG. 8, the control circuit 430 additionally includes a fourth control unit 406.

Figure 12:
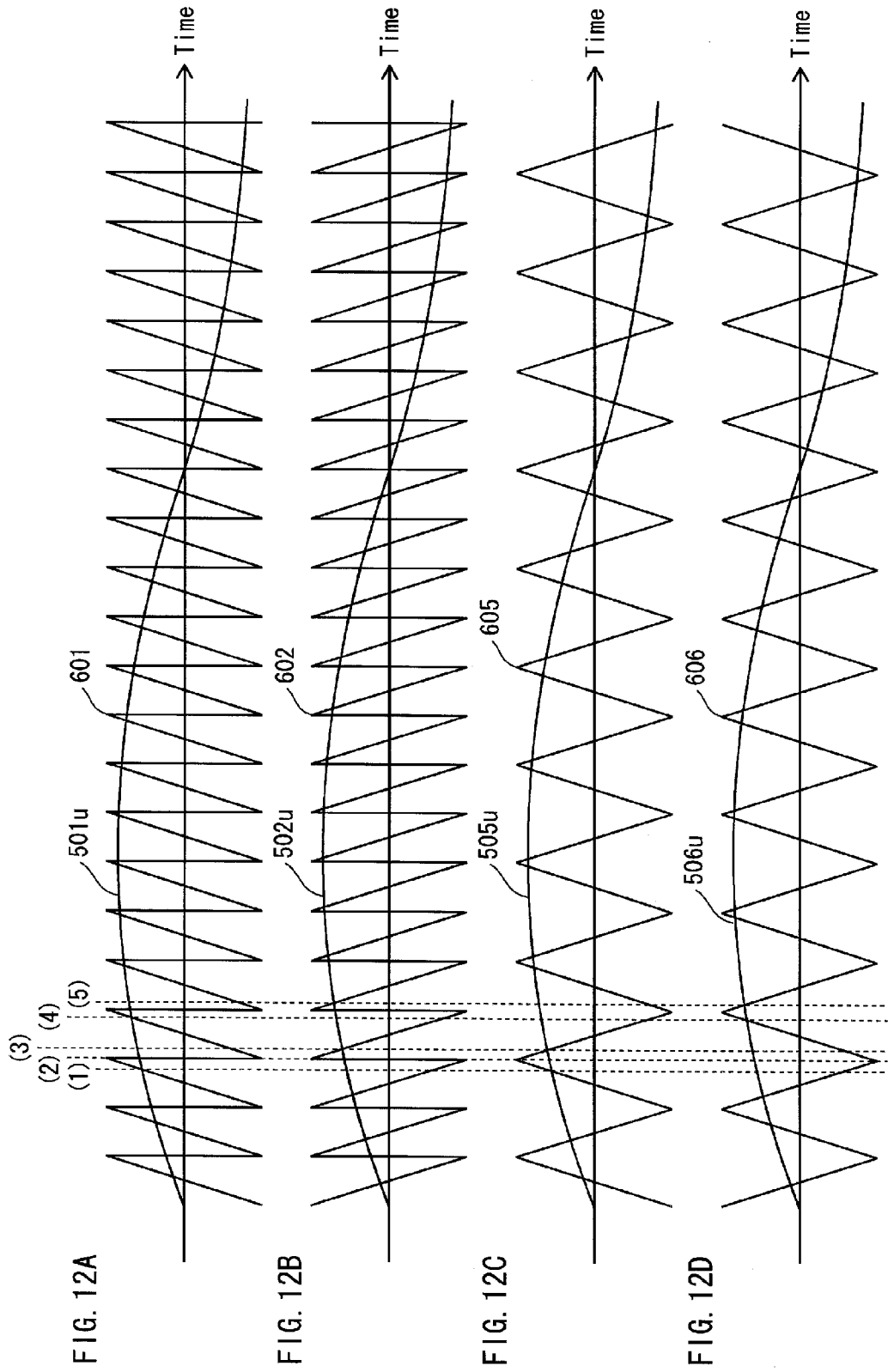
FIGS. 12A, 12B, 12C, and 12D are waveform diagrams showing the U-phase control signals and the first, the second, and the third carrier signals according to the modification (1).

The fourth control unit 406 includes a carrier inverting circuit 416 and a fourth PWM signal generation circuit family 426. The carrier inverting circuit 416 performs the operations similar to the carrier inverting circuit 412 of the first embodiment. This generates a fourth carrier signal 606 of a triangular waveform which is inverted with respect to the third carrier signal and has the same frequency as the third carrier signal, as shown in FIG. 12D. The fourth PWM signal generation circuit family 426 generates PWM signals of U-phase, V-phase, and W-phase, with use of the fourth carrier signal.

The next item contains a description of the fourth PWM signal generation circuit family 426 in the details.

(PWM Signal Generation Circuit Family 426)

The fourth PWM signal generation circuit family 426 includes a control signal generation circuit 436 and a comparator 446. The control signal generation circuit 436 outputs a control signal to the comparator 446. The fourth carrier signal generated by the carrier inverting circuit 416 is input to the inverting input terminal of the comparator 446. On the other hand, the control signal generated by the control signal generation circuit 436 is input to the non-inverting input terminal of the comparator 446. The comparator 446 outputs a drive signal of the pulse waveform as a comparison result, and the drive signal is supplied to the respective arms of the three-phase inverter 306 as a fourth PWM signal.

In the present embodiment, the first control unit 401 and the second control unit 402 switch ON the upper-arm switching devices when the control signal is greater than the carrier signal. Conversely, the comparator 445 included in the third control unit 405 and the comparator 446 included in the fourth control unit 406 switch OFF the upper-arm switching devices when the control signal is greater than the carrier signal. Further, as is similar to the three-phase coil 215 of the third embodiment, owing to the fact that three-phase coil 216 is wound in the direction opposite to the three-phase coils 211 and 212, the rotation directions of the three-phase alternative current motors 201, 202, 205, and 206 are made to be the same.

<Principle of Noise Reduction>

FIGS. 12A, 12B, 12C, and 12D are waveform diagrams showing the carrier signals and the U-phase control signals according to the modification (1) of the present invention. FIG. 12A shows the first carrier signal 601 and the U-phase control signal 501$u$ that are input to the comparator included in the first control unit 401. FIG. 12B shows the second carrier signal 602 and the U-phase control signal 502$u$ that are input to the comparator included in the second control unit 402. FIG. 12C shows the third carrier signal 605 and the U-phase control signal 505$u$ that are input to the comparator 445. FIG. 12D shows the fourth carrier signal 606 and a U-phase control signal 506$u$ that are input to the comparator 446. With reference to FIGS. 12A, 12B, 12C, and 12D, a description is given specifically of a principle of the noise reduction. Although the description herein only takes the upper-arm switching devices of U-phase as an example, the same principle also applies to V-phase and W-phase.

At a time point (1) shown in FIGS. 12A, 12B, 12C, and 12D, in the first control unit 401, the magnitude relation between the U-phase control signal 501$u$ and the first carrier signal 601 is reversed. Accordingly, the upper-arm switching device of the U-phase arm included in the three-phase inverter 301 transitions from the ON state to the OFF state. In the second control unit 402, no switching device makes a state transition. In the third PWM signal generation circuit family 425, the magnitude relation between the U-phase control signal 505$u$ and the third carrier signal 605 is reversed. Accordingly, the upper-arm switching device of the U-phase arm included in the third three-phase inverter 305 transitions from the OFF state to the ON state. In the fourth PWM signal generation circuit family 426, no switching device makes a state transition. Accordingly, at the time point (1), the transition from the ON state to the OFF state and the reverse transition from the OFF state to the ON state are simultaneously made in the first and the third three-phase inverters.

Then, at a time point (2), in the first control unit 401, the magnitude relation between the U-phase control signal 501$u$ and the first carrier signal 601 is reversed. Accordingly, the upper-arm switching device of the U-phase arm included in the three-phase inverter 301 transitions from the OFF state to the ON state. In the second control unit 402, the magnitude relation between the U-phase control signal 505$u$ and the second carrier signal 602 is reversed. Accordingly, the upper-arm switching device of the U-phase arm included in the second three-phase inverter 302 transitions from the ON state to the OFF state. In the third PWM signal generation circuit family 425 and the fourth PWM signal generation circuit family 426, no switching device makes a state transition. Accordingly, at the time point (2), the transition from the OFF state to the ON state and the reverse transition from the ON state to the OFF state are simultaneously made in the first and the second three-phase inverters.

Subsequently, at a time point (3), no switching device makes a state transition in the first control unit 401. In the second control unit 402, the magnitude relation between the U-phase control signal 502$u$ and the second carrier signal 602 is reversed. Accordingly, the upper-arm switching device of the U-phase arm included in the second three-phase inverter 302 transitions from the OFF state to the ON state. In the third PWM signal generation circuit family 425, the magnitude relation between the U-phase control signal 505$u$ and the third carrier signal 605 is reversed. Accordingly, the upper-arm switching device of the U-phase arm included in the third three-phase inverter 305 transitions from the ON state to the OFF state.

In the fourth PWM signal generation circuit family 426, no switching device makes a state transition. Accordingly, at the time point (3), the transition from the OFF state to the ON state and the reverse transition from the ON state to the OFF state are simultaneously made in the second and the third three-phase inverters.

Then, at a time point (4), in the first control unit 401, the magnitude relation between the U-phase control signal 501$u$ and the first carrier signal 601 is reversed. Accordingly, the upper-arm switching device of the U-phase arm included in the three-phase inverter 301 transitions from the ON state to the OFF state. In the second control unit 402 and the third PWM signal generation circuit family 425, no switching device makes a state transition. In the fourth PWM signal generation circuit family 426, the magnitude relation between the U-phase control signal 506$u$ and the fourth carrier signal 606 is reversed. Accordingly, the upper-arm switching device of the U-phase arm included in the fourth three-phase inverter 306 transitions from the OFF state to the ON state. Accordingly, at the time point (4), the transition from the ON state to the OFF state and the reverse transition from the OFF state to the ON state are simultaneously made in the first and the fourth three-phase inverters.

Subsequently, at a time point (5), no switching device makes a state transition in the first control unit 401. In the second control unit 402, the magnitude relation between the U-phase control signal 502$u$ and the second carrier signal 602 is reversed. Accordingly, the upper-arm switching device of the U-phase arm included in the second three-phase inverter 302 transitions from the OFF state to the ON state. In the third PWM signal generation circuit family 425, no switching device makes a state transition. In the fourth PWM signal generation circuit family 426, the magnitude relation between the U-phase control signal 506$u$ and the fourth carrier signal 606 is reversed. Accordingly, the upper-arm switching device of the U-phase arm included in the fourth three-phase inverter 306 transitions from the ON state to the OFF state. Accordingly, at the time point (5), the transition from the OFF state to the ON state and the reverse transition from the ON state to the OFF state are simultaneously made in the second and the fourth three-phase inverters.

As has been described, the present embodiment prevents the situation where the switching is made in the same state transition direction simultaneously in all the U-phase, the V-phase, and the W-phase arms in the third and the fourth three-phase inverters. Furthermore, the present embodiment allows the two switching devices to simultaneously transition from the ON state to the OFF state, and reversely from the OFF state to the ON state at any timing. As a result, the noise is cancelled out, whereby the improved noise reduction effect is provided. Besides, owing to the fact that the two switching devices are caused to transition to the ON state and the OFF state simultaneously, surge currents generated between the direct current power source and the three-phase inverters are also cancelled out by each other. Accordingly, the present modification is also useful to reduce the normal mode noise.

(2) Like Patent Literature 1, Patent Literature 2 also discloses a noise reduction method in the motor drive system. The noise reduction method of Patent Literature 2 differs from Patent Literature 1 in a point that the triangular wave voltage is used as the first carrier signal, and the inverse triangular wave voltage which is inverted with respect to the first carrier signal is used as the second carrier signal. Using the pair of the triangular and the inverse triangular waves having the same frequency allows the two switching devices to simultaneously transition to the ON state and to the OFF state. Accordingly, the noise cancellation effect is achieved. However, the structure of Patent Literature 2 has a problem that the noise cancellation effect is limited to timing when the control duty ratio is approximately 50%. The present modification therefore proposes the noise reduction method in the motor drive system including two three-phase inverters which is highly effective regardless of the timing.

<Structure>

(Load Drive System 140)

Figure 13:
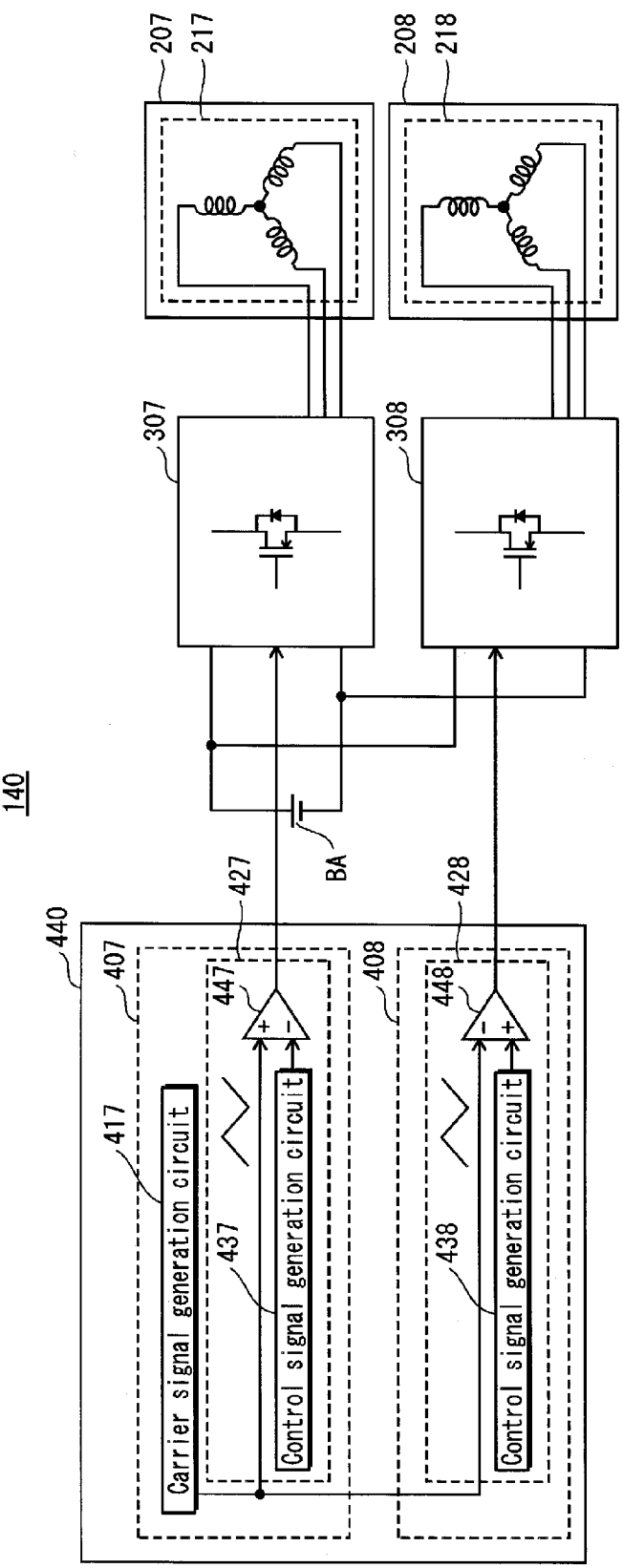
FIG. 13 shows an overall structure of the load drive system according to a modification (2).

FIG. 13 shows an overall structure of the load drive system according to the modification (2).

A load drive system 140 includes a direct current battery BA, three-phase alternative current motors 207 and 208, three-phase inverters 307 and 308, and a control circuit 440.

The three-phase alternative current motor 207 includes a three-phase coil 217 to which a three-phase current is supplied. The three-phase alternative current motor 208 differs from the three-phase alternative current motor 207 in a point that a three-phase coil 218 is wound in the direction opposite to the three-phase coil 217.

The three-phase alternative current motor 207 includes the three-phase coil 217 to which the three-phase current is supplied. The three-phase alternative current motor 208 includes the three-phase coil 218 to which a three-phase current is supplied, and differs from the three-phase alternative current motor 207 in the point that the three-phase coil 218 is wound in the direction opposite to the three-phase coil 217.

The three-phase inverters 307 and 308 have the same structure as the three-phase inverter 301 of the first embodiment. Note that, however, output terminals of the three-phase inverters 307 and 308 are connected to the three-phase alternative current motors 207 and 208, respectively, although input terminals of the three-phase inverters 307 and 308 are both connected to the direct current battery BA.

The control circuit 440 controls operations of the three-phase inverters 307 and 308. A description is given below of the details of the control circuit 440.

(Control Circuit 440)

The control circuit 407 includes a first control unit 407 that controls the operations of the three-phase inverter 307 and a second control unit 408 that controls the operations of the three-phase inverter 308.

The first control unit 401 includes a first carrier signal generation circuit 417 and a first PWM signal generation circuit family 427. The first carrier signal generation circuit 417 generates the first carrier signal. Although in the present modification the description is given while taking the triangular wave as an example of the first carrier signal, using the sawtooth wave also provides the same effect as the triangular wave. The first PWM signal generation circuit family 427 generates PWM signals of U-phase, V-phase, and W-phase, with use of the first carrier signal.

The second control unit 408 includes a second PWM signal generation circuit family 428. The second PWM signal generation circuit family 428 generates PWM signals of U-phase, V-phase, and W-phase, with use of the first carrier signal generated by the first carrier signal generation circuit 417.

The next item contains a description of the first PWM signal generation circuit family 427 and the second PWM signal generation circuit family 428 in the details.

(PWM Signal Generation Circuit Families 427 and 428)

The first PWM signal generation circuit family 427 includes a control signal generation circuit 437 and a comparator 447. The control signal generation circuit 437 outputs a control signal to the comparator 447. The control signal generated by the control signal generation circuit 437 is input to the inverting input terminal of the comparator 447. On the other hand, the first carrier signal generated by the first carrier signal generation circuit 417 is input to the non-inverting input terminal of the comparator 447. The comparator 447 outputs a drive signal of the pulse waveform created according to a comparison result, and the drive signal is supplied to the respective arms of the three-phase inverter 307 as a first PWM signal.

The second PWM signal generation circuit family 428 includes a control signal generation circuit 438 and a comparator 448. The control signal generation circuit 438 outputs a control signal to the comparator 448. The first carrier signal generated by the first carrier signal generation circuit 417 is input to the inverting input terminal of the comparator 448. On the other hand, the control signal generated by the control signal generation circuit 438 is input to the non-inverting input terminal of the comparator 448. The comparator 448 outputs a drive signal of the pulse waveform as a comparison result, and the drive signal is supplied to the respective arms of the three-phase inverter 308 as a second PWM signal.

Meanwhile, the control signal generation circuits 437 and 438 are operated in synchronization, and output the control signals having the same phase.

In the present embodiment, the comparator 447 switches ON the upper-arm switching devices when the control signal is greater than the carrier signal. Conversely, the comparator 448 switches OFF the upper-arm switching devices when the control signal is greater than the carrier signal. Here, like other embodiments and modifications, the three-phase coil 218 is wound in the direction opposite to the three-phase coil 217 in order to provide the three-phase alternative current motors 207 and 208 with the same rotation direction.

<Principle of Noise Reduction>

Figure 14:
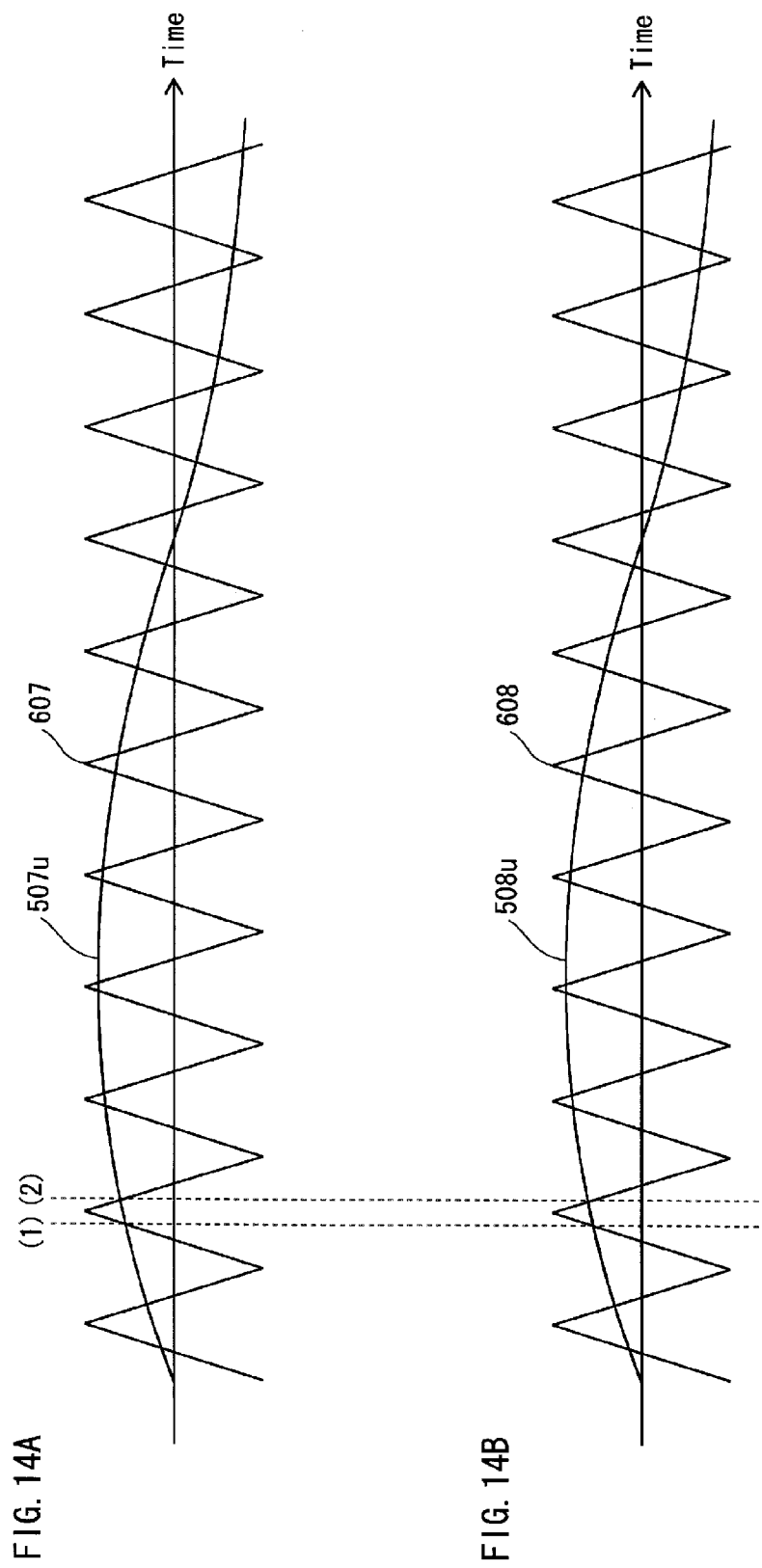
FIGS. 14A and 14B are waveform diagrams showing the U-phase control signals and the first carrier signals according to the modification (2).

FIGS. 14A and 14B are waveform diagrams showing the carrier signals and the U-phase control signals according to the modification (2) of the present invention. FIG. 14A is the waveform diagram in the comparator 447 and FIG. 14B is the waveform diagram in the comparator 448.

FIGS. 14A and 14B are the waveform diagrams showing the carrier signals and the U-phase control signals according to the modification (2) of the present invention. FIG. 14A shows a first carrier signal 607 and a U-phase control signal 507$u$ that are input to the comparator 447. FIG. 14A shows a second carrier signal 608 and a U-phase control signal 508$u$ that are input to the comparator 448. With reference to FIGS. 14A and 14B, a description is given specifically of a principle of the noise reduction. Although the description herein only takes the upper-arm switching devices of U-phase as an example, the same principle also applies to V-phase and W-phase.

At a time point (1) shown in FIGS. 14A and 14B, in the first PWM signal generation circuit family 427, the magnitude relation between the U-phase control signal 507$u$ and the first carrier signal 607 is reversed. Accordingly, the upper-arm switching device of the U-phase arm included in the three-phase inverter 307 transitions from the ON state to the OFF state. In the second PWM signal generation circuit family 428, the magnitude relation between the U-phase control signal 508u and the second carrier signal 608 is reversed. Accordingly, the upper-arm switching device of the U-phase arm included in the three-phase inverter 308 transitions from the OFF state to the ON state. Accordingly, at the time point (1), the transition from the ON state to the OFF state and the reverse transition from the OFF state to the ON state are simultaneously made in the two three-phase inverters.

Then, at a time point (2), in the first PWM signal generation circuit family 427, the magnitude relation between the U-phase control signal 507u and the first carrier signal 607 is reversed. Accordingly, the upper-arm switching device of the U-phase arm included in the three-phase inverter 307 transitions from the OFF state to the ON state. In the second PWM signal generation circuit family 428, the magnitude relation between the U-phase control signal 508u and the second carrier signal 608 is reversed. Accordingly, the upper-arm switching device of the U-phase arm included in the three-phase inverter 308 transitions from the ON state to the OFF state. Accordingly, at the time point (2), the transition from the ON state to the OFF state and the reverse transition from the OFF state to the ON state are simultaneously made in the two three-phase inverters.

As has been described above, the noise cancellation effect, which is limited to the timing when the duty is 50% in Patent Literature 2, can be obtained at any timing in the present modification. As a result, the present modification is able to provide the improved noise reduction effect.

(3) As mentioned in the Technical Problem section, in the case where the PWM signals are generated with use of only two types of carrier signals in the load drive system including three three-phase inverters, the switching is made in the same state transition direction simultaneously in all the U-phase, the V-phase, and the W-phase arms in the third three-phase inverter. So, the above embodiments reduce the noise by selecting, as the third carrier signals, such waveforms that are capable of preventing the situation where the switching is made in the same state transition direction simultaneously in all the U-phase, the V-phase, and the W-phase arms in the three-phase inverter. The present modification proposes the noise reduction method in which the conventional sawtooth wave voltage is used as the third carrier signal. Furthermore, in this method, the third carrier signals of U-phase, V-phase, and W-phase are provided with the sawtooth waveformes that are out of phase with each other such that the respective waveforms are instantly dropped or increased at shifted timings.

<Structure>

(Load Drive System 150)

Figure 15:
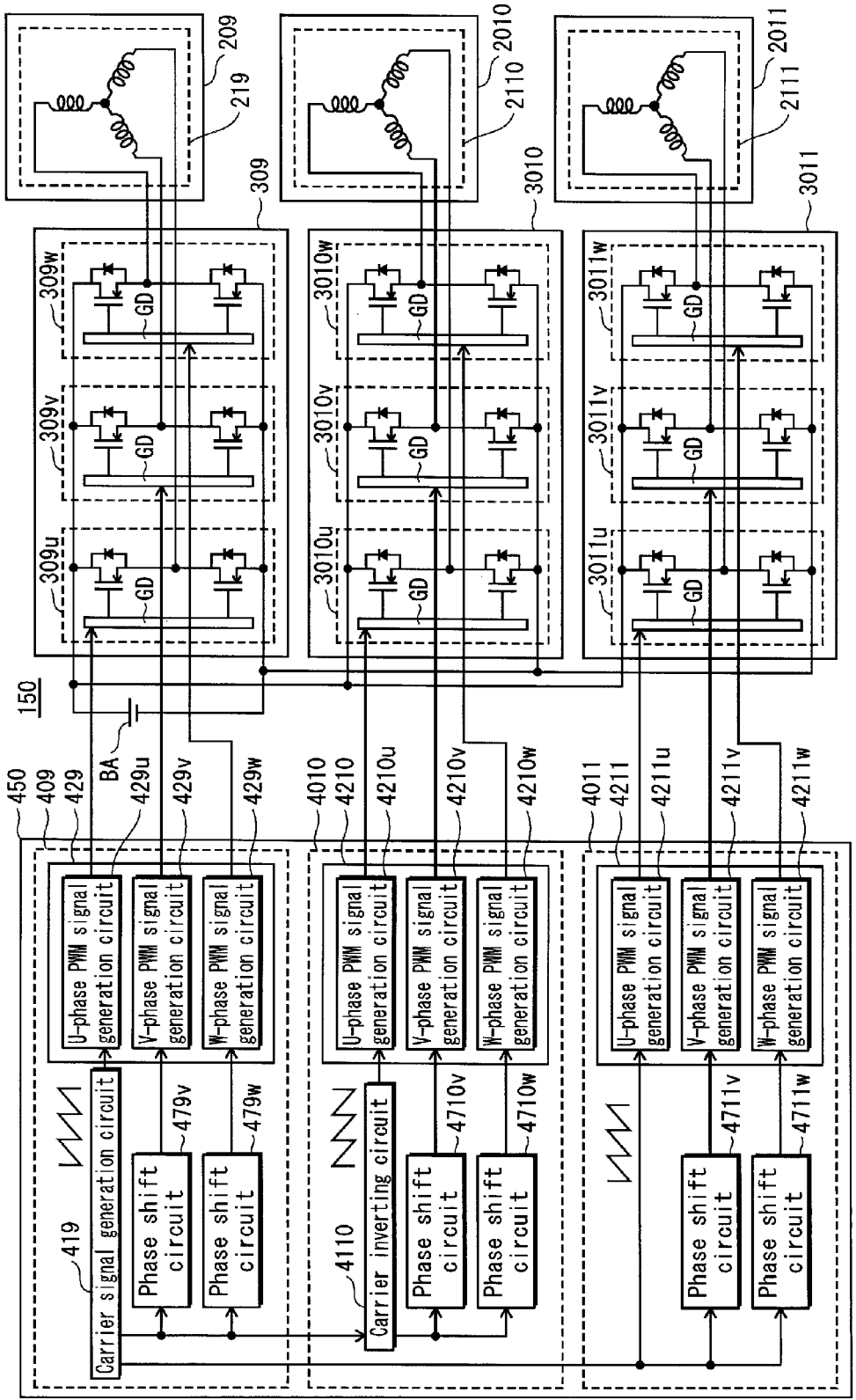
FIG. 15 shows an overall structure of the load drive system according to a modification (3).

FIG. 15 shows an overall structure of the load drive system according to the modification (3) of the present invention.

A load drive system 150 includes a direct current battery BA, three-phase alternative current motors 209, 2010, and 2011, three-phase inverters 309, 3010, and 3011, and a control circuit 450.

The three-phase alternative current motor 209 includes a three-phase coil 219 to which a three-phase current is supplied. The three-phase alternative current motor 2010 includes a three-phase coil 2110 to which a three-phase current is supplied. The three-phase alternative current motor 2011 includes a three-phase coil 2111 to which a three-phase current is supplied.

The input terminals of the three-phase inverters 309, 3010, and 3011 are connected to the direct current battery BA, and the output terminals of the three-phase inverters 309, 3010, and 3011 are connected to the three-phase alternative current motors 209, 2010, and 2011, respectively. The three-phase inverters 309, 3010, and 3011 have the same structure as the three-phase inverter 301 of the first embodiment.

The control circuit 450 controls operations of the three-phase inverters 309, 3010, and 3011. A description is given below of the details of the control circuit 450.

(Control Circuit 450)

The control circuit 450 includes a first control unit 409 that controls the operations of the three-phase inverter 309, a second control unit 4010 that controls the operations of the three-phase inverter 3010, and a third control unit 4011 that controls the operations of the three-phase inverter 3011.

The first control unit 409 includes a first carrier signal generation circuit 419, phase shift circuits 479v and 479w, and a first PWM signal generation circuit family 429. The first carrier signal generation circuit 419 performs the operations similar to the first carrier signal generation circuit 411 of the first embodiment. Note that, however, the first carrier signal generation circuit 419 outputs a first carrier signal to the first PWM signal generation circuit family 429, the phase shift circuits 479v and 479w, and the second control unit 4010.

The second control unit 4010 includes a carrier inverting circuit 4110, phase shift circuit 4710v and 4710w, and a second PWM signal generation circuit family 4210. The carrier inverting circuit 4110 performs the operations similar to the carrier inverting circuit 412 of the first embodiment. Note that, however, the carrier inverting circuit 4110 outputs a second carrier signal to the second PWM signal generation circuit family 4210 and the phase shift circuits 4710v and 4710w.

The third control unit 4011 includes phase shift circuits 4711v and 4711w and a third PWM signal generation circuit family 4211. The first carrier signal is also input to the third control unit 4011 and then output to the third PWM signal generation circuit family 4211 and the phase shift circuits 4711v and 4711w. The next item contains a description of operations of the phase shift circuits of the respective phases.

(V-phase Phase Shift Circuits 479v to 4711v, W-phase Phase Shift Circuits 479w to 4711w)

The V-phase phase shift circuits 479v operates to shift the phase of the V-phase carrier signal that has been input from the first carrier signal generation circuit 419 to the V-phase phase shift circuit 479v by θ. The V-phase phase shift circuit 4710v operates to shift the phase of the V-phase carrier signal that has been input from the carrier inverting circuit 4110 to the V-phase phase shift circuit 4710v by θ. The V-phase phase shift circuit 4711v also operates to shift the phase of the V-phase carrier signal that has been input from the first carrier signal generation circuit 419 to the V-phase phase shift circuits 4711v by θ. Similarly, the W-phase phase shift circuits 479w, 4710w, and 4711w operate to shift the phases of the W-phase carrier signals that have been input to the circuits 479w, 4710w, and 4711w by φ(≠θ), respectively.

The present modification aims to prevent the situation where the switching is made in the same state transition direction simultaneously in all the U-phase, the V-phase, and the W-phase arms in the three-phase inverter. For this aim, the phases of the U-phase, the V-phase, and the W-phase sawtooth wave voltages are made to be out of phase with each other such that the respective waveforms are instantly dropped or instantly increased at different times. This is also applied to the second carrier signal. Note that it is only necessary that the waveforms of the U-phase, the V-phase, and the W-phase sawtooth wave voltages input to the respective PWM signal generation circuits are merely slightly out of phase with each other at the timing when the respective waveforms are instantly dropped or instantly increased. Accordingly, as long as the effect is not degraded, amounts of the phase shift imparted by the respective phase shift circuits shift are not particularly limited.

The next item contains a description of the first PWM signal generation circuit family 429, the second PWM signal generation circuit family 4210, and the third PWM signal generation circuit family 4211 in the details.

(PWM Signal Generation Circuit Families 429, 4210, and 4211)

The first PWM signal generation circuit family 429 includes a first U-phase PWM signal generation circuit 429u, a first V-phase PWM signal generation circuit 429v, and a first W-phase PWM signal generation circuit 429w.

The first U-phase PWM signal generation circuit 429u includes a U-phase control signal generation circuit and a U-phase comparator. The U-phase carrier signal generated by the U-phase control signal generation circuit is input to the inverting input terminal of the U-phase comparator. On the other hand, the first U-phase carrier signal is input to the non-inverting input terminal of the U-phase comparator. The U-phase comparator outputs a drive signal of the pulse waveform as a comparison result, and the drive signal is supplied to a U-phase arm 309u of the three-phase inverter 309 as a first PWM signal.

The first V-phase PWM signal generation circuit 429v performs the operations similar to the first U-phase PWM signal generation circuit 429u with respect to V-phase. The first W-phase PWM signal generation circuit 429w also performs the operations similar to the first U-phase PWM signal generation circuit 429u with respect to W-phase.

The second PWM signal generation circuit family 4210 performs the operations similar to the first PWM signal generation circuit family 429 with respect to the second carrier signal. The third PWM signal generation circuit family 4211 also performs the operations similar to the first PWM signal generation circuit family 429 with respect to the first carrier signal. Furthermore, all control signal generation circuits of the same phase are operated in synchronization and output the control signals having the same phase. In the present modification, all the comparators switch ON the upper-arm switching devices of the corresponding three-phase invertes when the control signal is greater than the carrier signal.

As has been described, the present modification prevents the situation where the switching is made in the same state transition direction simultaneously in all of U-phase, V-phase, and W-phase in the third three-phase inverter. Furthermore, the effect can be achieved merely by operating at least the third V-phase phase shift circuit 4711v and the third W-phase phase shift circuit 4711w (it is also possible to operate the phase shift circuits 479v, 479w, and 4710v, and 4710w as needed within a scope in which the effect is not degraded).

Meanwhile, although FIG. 15 shows the example using the phase shift circuits in order to generate the U-phase, the V-phase, and the W-phase carrier signals that are out of phase with each other, the present invention is not limited to the example. Accordingly, other logic circuits may be used to configure such circuits.

Figure 17:
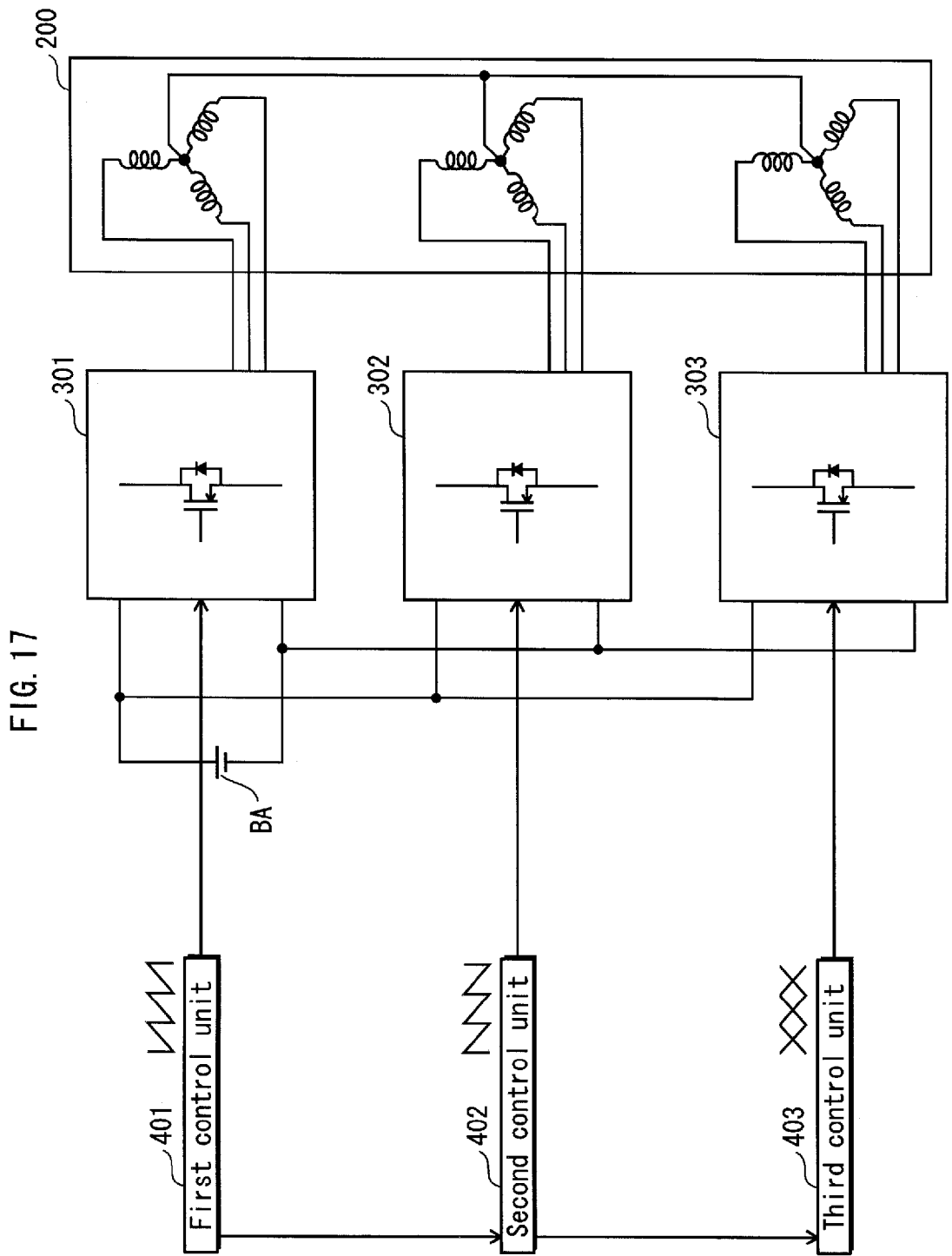
FIG. 17 shows an overall structure of the load drive system according to a modification (5).

(4) Although the above embodiments and modifications are described with the examples using a plurality of three-phase alternative current motors, the present invention is not limited to the examples. Only a single three-phase alternative current motor including a plurality of three-phase coils may be used instead. FIG. 17 shows an overall structure using a multi-coil three-phase alternative current motor 200 having a first coil, a second coil, and a third coil. In such a single three-phase alternative current motor having the plurality of coils also, the control methods of the present invention provides the same noise reduction effect.

Figure 18:
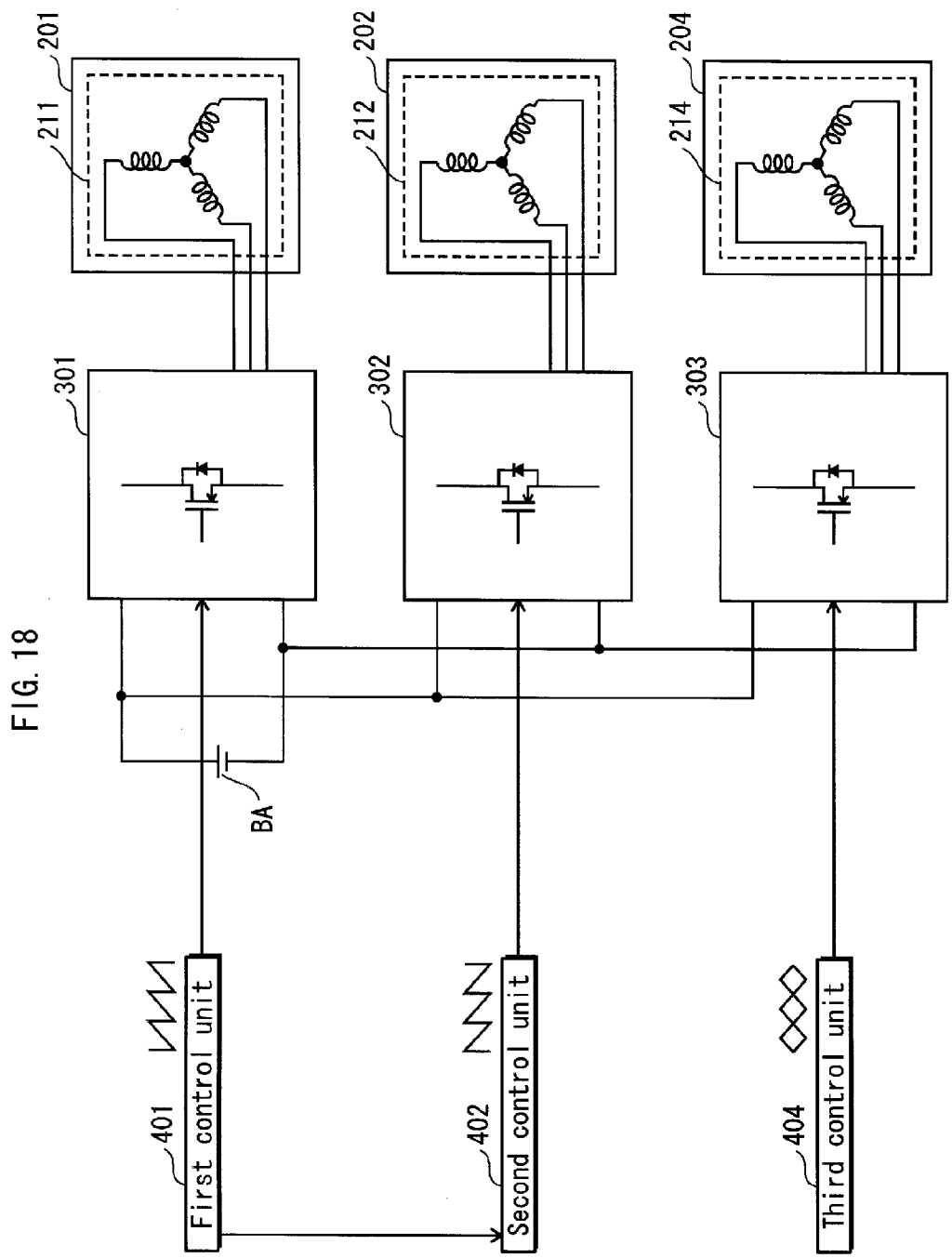
FIG. 18 shows an overall structure of the load drive system according to a modification (6).

(5) In the first and the second embodiments of the present invention, the carrier inverting circuit and the carrier synthesis circuit are used to synthesize the third carrier signal. However, the third carrier signal does not need to be generated by the above method, and other logic circuits may be used to configure the circuits. For example, as shown in FIG. 18, the carrier signals identical to the first and the second embodiments may be generated by an independent third carrier signal generation circuit.

(6) In the first to the third embodiments of the present invention, it is preferable to equalize a wiring distance between the direct current battery BA and the first three-phase inverter, a wiring distance between the direct current battery BA and the second three-phase inverter, and a wiring distance between the direct current battery BA and the third three-phase inverter. This realizes a layout which provides each wiring distance with the same amount of parasitic inductance. Here, in a case where capacitors are connected in parallel between the direct current battery BA and the three-phase inverters 301, 302, and 303, for example, ripple currents to the capacitors are also reduced. Accordingly, the number of capacitors to be used is also reduced, and the system is downsized.

(7) According to the structures of the above embodiments and the above modifications, the noise reduction effect is achieved even when the control signals of the same phase are out of phase with each other. Taking the first embodiment as an example, at the time point (2) of FIG. 3 the two switching devices surely transition to the ON state and to the OFF state simultaneously, and at the time points (1) and (3) of FIG. 3 the switching cannot be made in the same state transition direction. Accordingly, even when the control signals of the same phase are out of phase with each other, the improved noise reduction effect is still achieved compared with the conventional techniques, although the common mode noise is not completely cancelled out. This is not limited to the first embodiment. Any of the above embodiments and the above modifications is able to provide the improved noise reduction effect compared with the conventional techniques.

(8) Although the figures illustrate that the three-phase inverters are supplied with the currents from the common direct current power source, the three-phase inverters may be supplied with the currents from separate direct current power sources.

(9) The figures merely schematically show the layout configuration only to make the present invention understandable, and the present invention is not limited to the examples shown in the figures. Furthermore, for the sake of understandability, some parts in the figures are omitted.

(10) The above embodiments and the above modifications are merely preferred examples, and the present invention is not limited to these examples at all. For example, although the figures illustrate the three-phase alternative current motors as an example of the loads, the loads are not limited to the three-phase alternative current motor at all. Furthermore, the structures described in the embodiments and the modifications may be appropriately combined.

(11) Note that even in a case where each component has the same characteristics (e.g. in a case where the three-phase alternative current motors each have a same amount of parasitic capacitance to ground), any tolerance within a scope of manufacturing tolerance is of course acceptable.

Furthermore, in the principle of the noise reduction described with reference to FIG. 3 in the first embodiment, the noise is reduced by causing the two switching devices to simultaneously transition from the ON state to the OFF state, and from the OFF state to the ON state, that is to say, by controlling the timing of the switching such that the transitions are simultaneously made. Here, to "simultaneously transition from the ON state to the OFF state, and from the OFF state to the ON state" refers to a situation where the time of the transition from the ON state to the OFF state (which corresponds to a time in which the voltage sharply drops in the sawtooth wave) overlaps with the time of the transition from the OFF state to the ON state (which corresponds to a time in which the voltage sharply increases in the inverse sawtooth wave). Note that the time of the transition from the ON state to the OFF state does not need to be completely overlapped with the time of the transition from the OFF state to the ON state, and that only a partial overlap between the times of the transitions is also within the scope of the present invention.

(12) A description is given of another modification in which the load drive system 100 of the first embodiment is applied to a vehicle.

Figure 19:
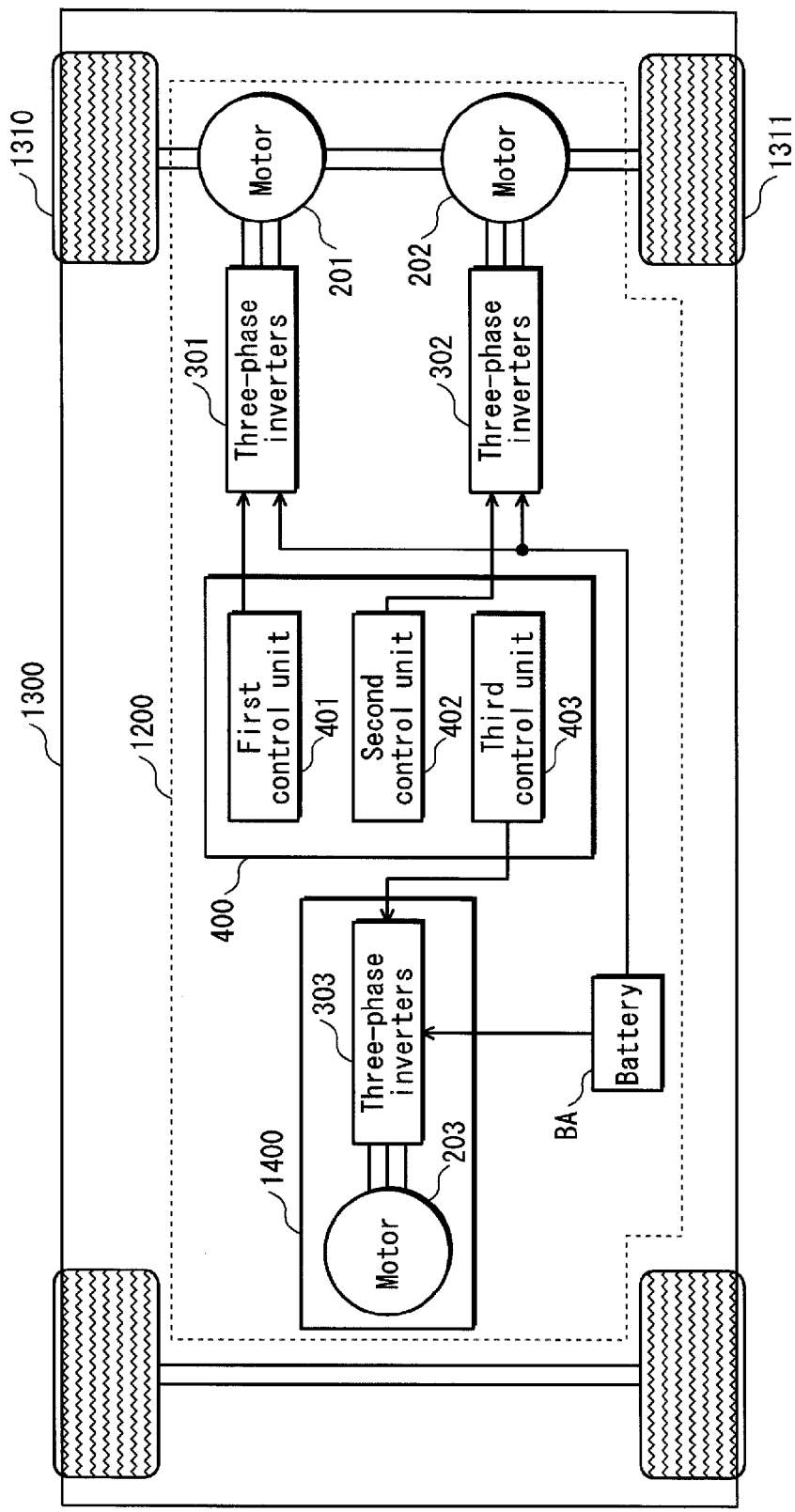
FIG. 19 is a schematic view showing a structure of a vehicle having a vehicle control system according to a modification (12).

FIG. 19 is a schematic view showing a structure of a vehicle 1300 having a vehicle control system 1200 according to the present modification. As shown in FIG. 19, the vehicle 1300 includes the vehicle control system 1200 and wheels 1310 and 1311.

The load drive system 1200 includes the direct current battery BA, the control circuit 400, the three-phase inverters 301 and 302, the three-phase alternative current motors 201 and 202, and an air conditioner 1400. The direct current battery BA, the control circuit 400, the three-phase inverters 301 and 302, and the three-phase alternative current motors 201 and 202 have the structures similar to the first embodiment. The air conditioner 1400 regulates an air inside the vehicle 1300, and includes the three-phase inverter 303 and the three-phase alternative current motor 203.

The three-phase alternative current motors 201 and 202 are each used as a main motor used for driving the wheels 1310 and 1311. On the other hand, the three-phase alternative current motor 203 included in the air conditioner 1400 is used as an electrical compressor motor for driving the air conditioner 1400.

Here, it is sufficient to select any two of the three-phase alternative current motors 201, 202, and 203 as the main motors. However, the two three-phase alternative current motors used as the main motors are preferably operated in synchronization. For this reason, the present modification assigns the three-phase alternative current motors 201 and 202 as the main motors because the motors 201 and 202 are controlled according to the PWM signals each using the carrier signals having the same frequency. Note that, however, such a pair of the three-phase alternative current motors is not necessarily assigned as the main motors, and this may be appropriately changed according to the structure of the vehicle control system.

The present invention is not limited to the modification shown in FIG. 19, and the assignment of the three-phase alternative current motors 201, 202, and 203 may be appropriately changed. For example, the three-phase alternative current motors 201, 202, and 203 may be assigned as the main motor, the electrical compressor motor, and a generator motor, respectively. Other structures are also considered.

Although the present modification has been described with the load drive system according to the first embodiment applied to the vehicle as an example, it is also possible to apply the load drive system having a structure according to embodiments other than the first embodiment and the modifications.

The present invention is suitably applicable to motor drive systems for powering hybrid vehicles, electrical vehicles, fuel-cell vehicles, and the like, as these vehicles particularly require reduced noise characteristics.

REFERENCE SIGNS LIST 201 to 209, 2010, 2011 three-phase alternative current motor
211 to 219, 2110, 2111 three-phase coil
301 to 309, 3010, 3011 three-phase inverter
401, 407, 409 first control unit
402, 408, 4010 second control unit
403, 404, 405, 4011 third control unit
406 fourth control unit
411, 417, 419 first carrier signal generation circuit
415 third carrier signal generation circuit
412, 416, 4110 carrier inverting circuit
413, 414 carrier synthesis circuit
421, 427, 429 first PWM signal generation circuit family
422, 428, 4210 second PWM signal generation circuit family
423, 424, 425, 4211 third PWM signal generation circuit family
426 fourth PWM signal generation circuit family
431 to 438 control signal generation circuit
431$u$ to 433$u$ control signal generation circuit
441 to 448 comparator
441$u$ to 443$u$ U-phase comparator
501$u$ to 508$u$ U-phase control signal
501$v$ to 503$v$ V-phase control signal
501$w$ to 503$w$ W-phase control signal

The invention claimed is:

1. A load drive system for driving first, second, and third loads, comprising:
    first, second, and third three-phase inverters each having an input terminal and an output terminal, the input terminals of the first, the second, and the third three-phase inverters being connected to a direct current power source, the output terminals of the first, the second, and the third three-phase inverters being respectively connected to the first, the second, and the third loads;
    a first control unit operable to (i) generate a first carrier signal of a sawtooth waveform and (ii) control the first three-phase inverter according to the generated first carrier signal;
    a second control unit operable to (i) generate a second carrier signal of a sawtooth waveform which is inverted with respect to the first carrier signal and has a same frequency and a same phase as the first carrier signal and (ii) control the second three-phase inverter according to the generated second carrier signal; and
    a third control unit operable to (i) generate a third carrier signal of a triangular waveform having ramps respectively equal to the sawtooth waveform of the first carrier signal and the sawtooth waveform of the second carrier signal, the triangular waveform either having a same phase as the first and the second carrier signals or being out of phase by half a period relative to the first and the second carrier signals, and (ii) control the third three-phase inverter according to the generated third carrier signal.

2. The load drive system of claim 1, wherein
    the second control unit generates the second carrier signal by inverting the first carrier signal generated by the first control unit, and the third control unit generates the third carrier signal by synthesizing the first carrier signal generated by the first control unit and the second carrier signal generated by the second control unit.

3. The load drive system of claim 1, wherein
the first, the second, and the third loads are respectively first, second, and third motor coils which are wound in a same direction,
the first control unit controls the first three-phase inverter by supplying a first drive signal to the first three-phase inverter, the first drive signal indicating a result of comparing the first carrier signal with a first control signal,
the second control unit controls the second three-phase inverter by supplying a second drive signal to the second three-phase inverter, the second d drive signal indicating a result of comparing the second carrier signal with a second control signal, and
the third control unit (i) generates the third carrier signal which is out of phase by half the period relative to the first and the second carrier signals and (ii) controls the third three-phase inverter by supplying a third drive signal to the third three-phase inverter, the third drive signal indicating a result of comparing the third carrier signal with a third control signal.

4. The load drive system of claim 3, wherein
the first, the second, and the third control signals each comprise a U-phase signal, a V-phase signal, and a W-phase signal, and have an equal amplitude with respect to each phase.

5. The load drive system of claim 3, wherein
each of the first, the second, and the third three-phase inverters includes a U-phase arm, a V-phase arm, and a W-phase arm, and
the first, the second, and the third drive signals are supplied to the respective arms of the first, the second, and the third three-phase inverters, and provided with an equal dead time in all arms of a same phase.

6. The load drive system of claim 3, wherein
first, second, and third control signal generation circuits for generating, respectively, the first, the second, and the third control signals are set to have an equal control gain with each other.

7. The load drive system of claim 3, wherein
the first, the second, and the third motor coils have neutral points which are connected with each other.

8. The load drive system of claim 3, wherein
the first, the second, and the third motor coils are housed either in a single motor or in first, second, and third motors separately.

9. The load drive system of claim 1, wherein
the first, the second, and the third loads are respectively first, second, and third motor coils, the third motor coil being wound in a direction opposite to the first and the second motor coils,
the first control unit controls the first three-phase inverter by supplying a first drive signal to the first three-phase inverter, the first drive signal indicating a result of comparing the first carrier signal with a first control signal,
the second control unit controls the second three-phase inverter by supplying a second drive signal to the second three-phase inverter, the second drive signal indicating a result of comparing the second carrier signal and a second control signal, and
the third control unit (i) generates the third carrier signal which has the same phase and a same frequency as the first and the second carrier signals and (ii) controls the third three-phase inverter by supplying a third drive signal to the third three-phase inverter, the third drive signal being an inverse of a result of comparing the third carrier signal with a third control signal.

10. The load drive system of claim 1, wherein
the first, the second, and the third loads are respectively first, second, and third motor coils, the third motor coil being wound in a direction opposite to the first and the second motor coils,
the first control unit controls the first three-phase inverter by supplying a first drive signal to the first three-phase inverter, the first drive signal indicating a result of comparing the first carrier signal with a first control signal,
the second control unit controls the second three-phase inverter by supplying a second drive signal to the second three-phase inverter, the second drive signal indicating a result of comparing the second carrier signal with a second control signal, and
the third control unit (i) generates the third carrier signal which has the same phase as the first and the second carrier signals and has half the frequency relative to the first and the second carrier signals and (ii) controls the third three-phase inverter by supplying a third drive signal to the third three-phase inverter, the third drive signal being an inverse of a result of comparing the third carrier signal with a third control signal.

11. The load drive system of claim 10, wherein
a fourth load is further driven in the load drive system, the fourth load being a fourth motor coil, the fourth motor coil being wound in the direction opposite to the first and the second motor coils, and
the load drive system further comprises:
a fourth three-phase inverter having an input terminal connected to a direct current power source and an output terminal connected to the fourth load; and
a fourth control unit operable to (i) generate a fourth carrier signal of a triangular waveform which is inverted with respect to the third carrier signal and has a same frequency as the third carrier signal and (ii) control the fourth three-phase inverter by supplying a fourth drive signal to the fourth three-phase inverter, the fourth drive signal being an inverse of a result of comparing the fourth carrier signal with a fourth control signal.

12. The load drive system of claim 1, wherein
wiring distances between each of the first, the second, and the third three-phase inverters and the corresponding direct current power source are set to be equal to each other.

13. The load drive system of claim 1, wherein
the first, the second, and the third loads each have a same amount of parasitic capacitance to ground.

14. The load drive system of claim 1, wherein
the first, the second, and the third three-phase inverters each include a switching device, and
a time required for each switching device to transition from an ON state to an OFF state equals a time required for each switching device to transition from the OFF state to the ON state.

15. The load drive system of claim 1, wherein
the input terminals of the first, the second, and the third three-phase inverters are connected to a common direct current power source.

16. A vehicle control system including the load drive system of claim 1, wherein
the output terminals of the first and the second three-phase inverters are connected to first and second main motors, respectively, and the output terminal of the third three-phase inverter is connected to an electrical compressor motor.

17. A motor drive system for driving first and second motor coils, comprising:
   first and second three-phase inverters each having an input terminal, an output terminal, and a circuit including an upper-arm and a lower-arm each having a switching device, the switching device of the upper-arm connected in series to the switching device of the lower-arm the input terminals of the first and the second three-phase inverters being connected to a direct current power source, the output terminals of the first and the second three-phase inverters being respectively connected to the first and the second motor coils;
   a first control unit operable to (i) generate a first carrier signal and (ii) control each of the switching devices of the first three-phase inverter by supplying a first drive signal to each of the switching devices of the first three-phase inverter, the first drive signal indicating a result of comparing the first carrier signal with a first control signal; and
   a second control unit operable to control each of the switching devices of the second three-phase inverter by supplying a second drive signal to each of the switching devices of the second three-phase inverter, the second drive signal being an inverse of a result of comparing a second carrier signal with a second control signal, the second carrier signal having a same phase and a same frequency as the first carrier signal, and the second control signal having a same phase and a same frequency as the first control signal, wherein
   a waveform of the second drive signal causes, by being an inverse of a waveform of the first drive signal, (i) the switching device of the upper-arm in the first three-phase inverter and the switching device of the upper-arm in the second three-phase inverter to switch and transition into opposite states, and (ii) the switching device of the lower-arm in the first three-phase inverter and the switching device of the lower-arm in the second three-phase inverter to switch and transition into opposite states.

18. The motor drive system of claim 17, wherein
   the first, and the second motor coils are housed in a single motor, and
   the second motor coil is wound in a direction opposite to the first motor coil.

* * * * *